US010962667B2

(12) United States Patent
Iranpour

(10) Patent No.: US 10,962,667 B2
(45) Date of Patent: Mar. 30, 2021

(54) DATA-DRIVEN CLOCK DRIFT ADJUSTMENT

(71) Applicant: WESTERNGECO LLC, Houston, TX (US)

(72) Inventor: Kambiz Iranpour, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 351 days.

(21) Appl. No.: 16/067,261

(22) PCT Filed: Dec. 12, 2016

(86) PCT No.: PCT/US2016/066241
§ 371 (c)(1),
(2) Date: Jun. 29, 2018

(87) PCT Pub. No.: WO2017/116675
PCT Pub. Date: Jul. 6, 2017

(65) Prior Publication Data
US 2019/0011586 A1 Jan. 10, 2019

Related U.S. Application Data

(60) Provisional application No. 62/272,193, filed on Dec. 29, 2015.

(51) Int. Cl.
*G01V 1/36* (2006.01)
*G01V 1/30* (2006.01)
*G01V 1/26* (2006.01)

(52) U.S. Cl.
CPC .............. *G01V 1/36* (2013.01); *G01V 1/26* (2013.01); *G01V 1/30* (2013.01); *G01V 2200/12* (2013.01); *G01V 2200/14* (2013.01)

(58) Field of Classification Search
CPC ... G01V 1/24; G01V 1/26; G01V 1/28; G01V 1/30; G01V 1/36; G01V 2200/12; G01V 2200/14
(Continued)

(56) References Cited

U.S. PATENT DOCUMENTS 6,002,640 A 12/1999 Harmon
8,559,271 B2 10/2013 Barakat et al.
(Continued)

FOREIGN PATENT DOCUMENTS

WO 98/52072 A1 11/1998
WO 2008/147584 A2 12/2008

OTHER PUBLICATIONS

Examination Report issued in the corresponding GC application GC/2016/32693, dated Apr. 30, 2019 (5 pages).
(Continued)

*Primary Examiner* — John H Le
(74) *Attorney, Agent, or Firm* — Michael Guthrie

(57) ABSTRACT

A method can include receiving seismic data acquired by a sensor unit responsive to emission of seismic energy in a frequency sweep of a duration having a duration time; correlating the seismic data and individual portions of the frequency sweep that correspond to individual time windows to generate individual sets of correlated seismic data; for a common event, identifying a corresponding event time in each of the individual sets of correlated seismic data; and determining a clock drift time based at least in part on the event times.

20 Claims, 12 Drawing Sheets

(58) Field of Classification Search
USPC .................... 702/14; 367/13, 14, 21, 51, 57
See application file for complete search history.

(56) References Cited

U.S. PATENT DOCUMENTS

| | | |
|---|---|---|
| 2004/0117118 A1 | 6/2004 | Collins et al. |
| 2006/0203614 A1* | 9/2006 | Harmon .................. G01V 1/42 367/57 |
| 2008/0219094 A1* | 9/2008 | Barakat .................... G01V 1/22 367/21 |
| 2012/0113747 A1 | 5/2012 | Ferber |
| 2012/0287753 A1* | 11/2012 | Hatchell ................. G01V 1/38 367/21 |
| 2014/0278119 A1 | 9/2014 | Halliday et al. |

OTHER PUBLICATIONS

International Preliminary Report on Patentability for the equivalent International patent application PCT/US2016/066241 dated Jul. 3, 2018.
Extended European Search Report for EP Application No. 16882296.3; dated Dec. 3, 2019; 8 pgs.
International Search Report and Written Opinion for the equivalent International patent application PCT/US2016/066241 dated Apr. 3, 2017.

* cited by examiner

DATA-DRIVEN CLOCK DRIFT ADJUSTMENT

RELATED APPLICATIONS

This application claims priority to and the benefit of a U.S. Provisional Application having Ser. No. 62/272,193, filed 29 Dec. 2015, which is incorporated by reference herein.

BACKGROUND

Reflection seismology finds use in geophysics to estimate properties of subsurface formations. Reflection seismology may provide seismic data representing waves of elastic energy, as transmitted by P-waves and S-waves, in a frequency range of approximately 1 Hz to approximately 100 Hz. Seismic data may be processed and interpreted to understand better one or more of composition, fluid content, extent and geometry of subsurface rocks.

SUMMARY

A method can include receiving seismic data acquired by a sensor unit responsive to emission of seismic energy in a frequency sweep of a duration having a duration time; correlating the seismic data and individual portions of the frequency sweep that correspond to individual time windows to generate individual sets of correlated seismic data; for a common event, identifying a corresponding event time in each of the individual sets of correlated seismic data; and determining a clock drift time based at least in part on the event times. A system can include a processor; memory operatively coupled to the processor; and instructions stored in the memory and executable by the processor to instruct the system to: receive seismic data acquired by a sensor unit responsive to emission of seismic energy in a frequency sweep of a duration having a duration time; correlate the seismic data and individual portions of the frequency sweep that correspond to individual time windows to generate individual sets of correlated seismic data; for a common event, identify a corresponding event time in each of the individual sets of correlated seismic data; and determine a clock drift time based at least in part on the event times. A method can include receiving a timing signal; adjusting time of a clock based at least in part on the timing signal; sensing seismic energy at a plurality of clock times; and recording the clock times and values associated with the sensed seismic energy.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics to estimate properties of subsurface formations. Reflection seismology may provide seismic data representing waves of elastic energy, as transmitted by P-waves and S-waves, in a frequency range of approximately 1 Hz to approximately 100 Hz or optionally less than 1 Hz and/or optionally more than 100 Hz. Seismic data may be processed and interpreted to understand better composition, fluid content, extent and geometry of subsurface rocks.

Figure 1:
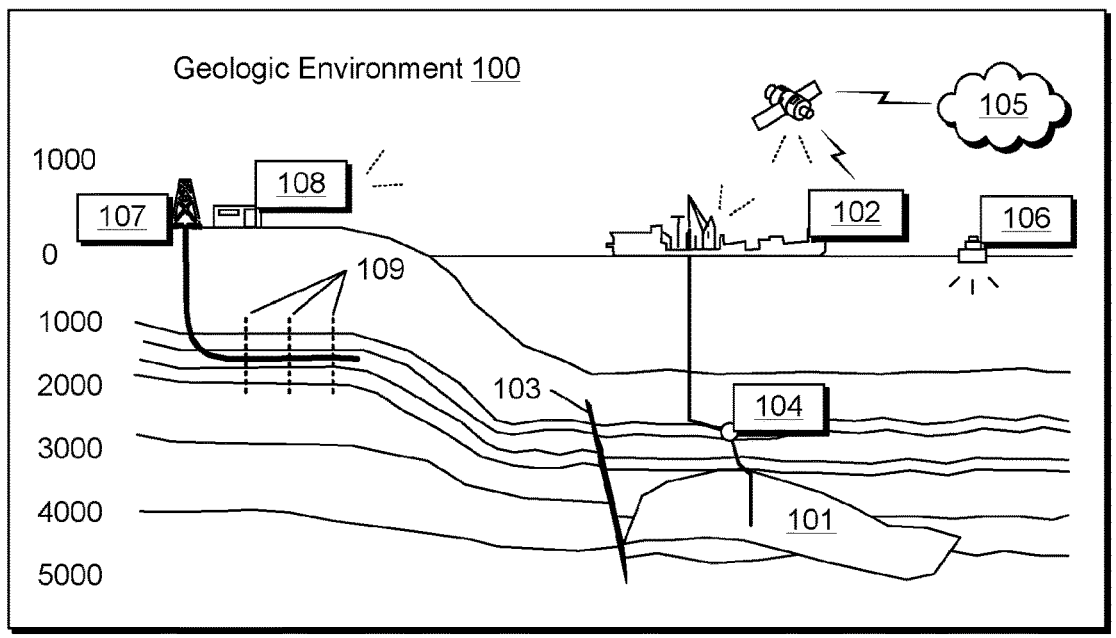
FIG. 1 illustrates a geologic environment and a technique.
Figure 1:
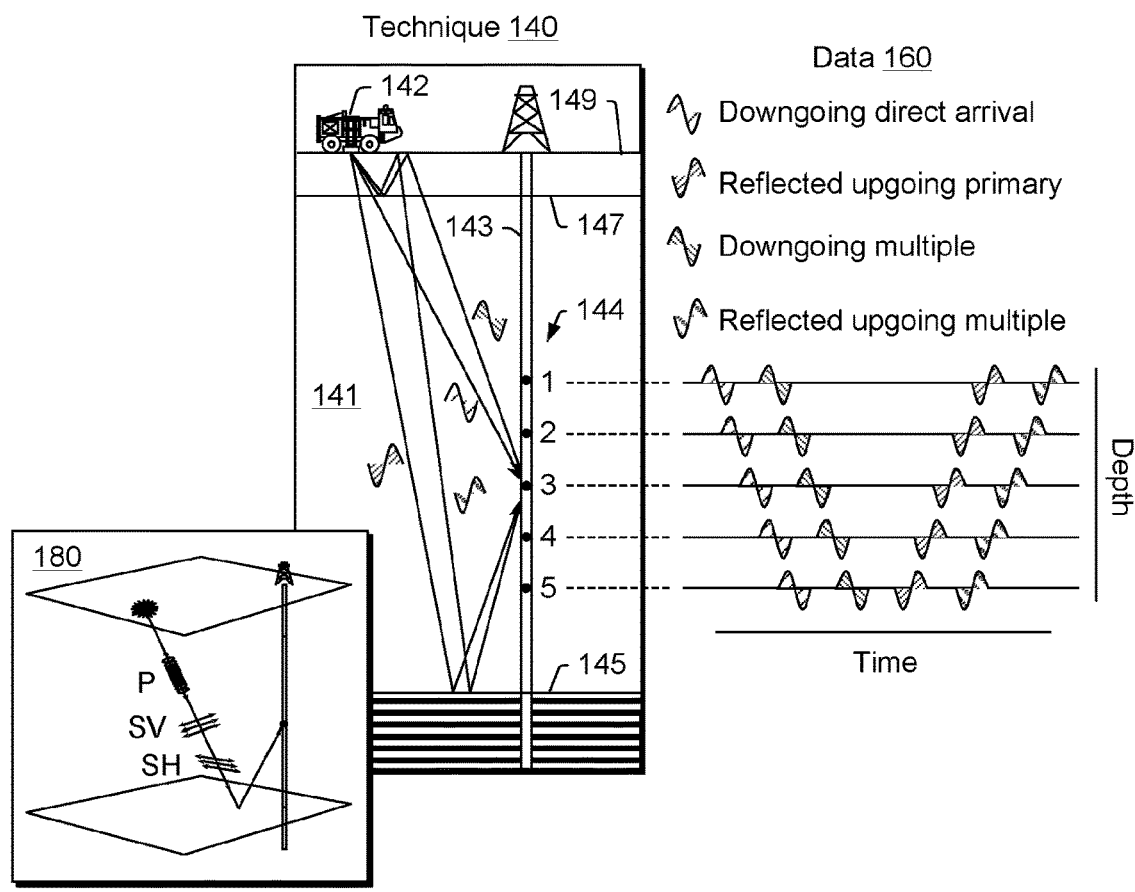

FIG. 1 shows a geologic environment 100 (an environment that includes a sedimentary basin, a reservoir 101, a fault 103, one or more fractures 109, etc.) and an acquisition technique 140 to acquire seismic data (see data 160). A system may process data acquired by the technique 140 to allow for direct or indirect management of sensing, drilling, injecting, extracting, etc., with respect to the geologic environment 100. In turn, further information about the geologic environment 100 may become available as feedback (optionally as input to the system). An operation may pertain to a reservoir that exists in the geologic environment 100 such as the reservoir 101. A technique may provide information (as an output) that may specifies one or more location coordinate of a feature in a geologic environment, one or more characteristics of a feature in a geologic environment, etc.

The geologic environment 100 may be referred to as or include one or more formations. A formation may be a unit of lithostratigraphy such as a body of rock that is sufficiently distinctive and continuous that it can be mapped. In stratigraphy, a formation may be a body of strata of predominantly one type or combination of types where multiple formations form groups, and subdivisions of formations are members.

A sedimentary basin may be a depression in the crust of the Earth formed by plate tectonic activity in which sediments accumulate. Over a period of geologic time, continued deposition may cause further depression or subsidence. With respect to a petroleum systems analysis, if rich hydrocarbon source rocks occur in combination with appropriate depth and duration of burial, hydrocarbon generation may possibly occur within a basin. Exploration plays and prospects may be developed in basins or regions in which a complete petroleum system has some likelihood of existing. The geologic environment 100 of FIG. 1 may include one or more plays, prospects, etc.

A system may be implemented to process seismic data, optionally in combination with other data. Processing of data may include generating one or more seismic attributes, rendering information to a display or displays, etc. A process or workflow may include interpretation, which may be performed by an operator that examines renderings of information and that identifies structure or other features within such renderings. Interpretation may be or include analyses of data with a goal to generate one or more models and/or predictions (about properties and/or structures of a subsurface region).

A system may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance.

A system may include add-ons or plug-ins that operate according to specifications of a framework environment. A commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. Seismic data may be processed using a framework such as the OMEGA® framework (Schlumberger Limited, Houston, Tex.). The OMEGA® framework provides features that can be implemented for processing of seismic data. A framework may be scalable such that it enables processing and imaging on a single workstation, on a massive compute cluster, etc.

A framework for processing data may include features for 2D line and 3D seismic surveys. Modules for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and post-stack seismic data conditioning, inversion (seismic to properties and properties to synthetic seismic), wedge modeling for thin-bed analysis, amplitude versus offset (AVO) and amplitude versus angle (AVA) analysis, reconnaissance, etc. A workflow may aim to output rock properties based at least in part on processing of seismic data. Various types of data may be processed to provide one or more models (earth models); consider processing of one or more of seismic data, well data, electromagnetic and magnetic telluric data, reservoir data, etc.

In FIG. 1, the geologic environment 100 includes an offshore portion and an onshore portion. A geologic environment may be or include one or more of an offshore geologic environment, a seabed geologic environment, an ocean bed geologic environment, etc.

The geologic environment 100 may be outfitted with any of a variety of sensors, detectors, actuators, etc. Equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. One or more satellites may be provided for purposes of communications, data acquisition, etc.; noting that a satellite may additionally or alternatively include circuitry for imagery (spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109; consider a well in a shale formation that may include natural fractures, artificial fractures (hydraulic fractures) or a combination of natural and artificial fractures. A well may be drilled for a reservoir that is laterally extensive. Lateral variations in properties, stresses, etc. may exist where an assessment of such variations may assist with planning, operations, etc. to develop the reservoir (via fracturing, injecting, extracting, etc.). The equipment 107 and/or 108 may include components, a system, systems, etc. for fracturing, seismic sensing, analysis of seismic data, assessment of one or more fractures, etc.

A system may be used to perform one or more workflows. A workflow may be a process that includes a number of worksteps. A workstep may operate on data to create new data, to update existing data, etc. A system may operate on one or more inputs and create one or more results based on one or more algorithms. A system may include a workflow editor for creation, editing, executing, etc. of a workflow. A workflow may include receiving instructions to interact with rendered information to process information and optionally render processed information. A workflow may include transmitting information that may control, adjust, initiate, etc. one or more operations of equipment associated with a geologic environment.

In FIG. 1, the technique 140 may be implemented with respect to a geologic environment 141. As shown, an energy source (a transmitter) 142 may emit energy where the energy travels as waves that interact with the geologic environment 141. The geologic environment 141 may include a bore 143 where one or more sensors (receivers) 144 may be positioned in the bore 143. Energy emitted by the energy source 142 may interact with a layer (a structure, an interface, etc.) 145 in the geologic environment 141 such that a portion of the energy is reflected, which may then be sensed by one or more of the sensors 144. Such energy may be reflected as an upgoing primary wave (or "primary" or "singly" reflected wave). A portion of emitted energy may be reflected by more than one structure in the geologic environment and referred to as a multiple reflected wave (or "multiple"). The geologic environment 141 is shown as including a layer 147 that resides below a surface layer 149. Given such an environment and arrangement of the source 142 and the one or more sensors 144, energy may be sensed as being associated with particular types of waves.

FIG. 1 also shows various types of waves as including P, SV an SH waves. A P-wave can be an elastic body wave or sound wave in which particles oscillate in the direction the wave propagates. P-waves incident on an interface (at other than normal incidence, etc.) may produce reflected and transmitted S-waves ("converted" waves). An S-wave or shear wave can be an elastic body wave in which particles oscillate perpendicular to the direction in which the wave propagates. S-waves may be generated by a seismic energy sources (other than an air gun). S-waves may be converted to P-waves. S-waves tend to travel more slowly than P-waves and do not travel through fluids that do not support shear. In general, recording of S-waves involves use of one or more receivers operatively coupled to earth (capable of receiving shear forces with respect to time). Interpretation of S-waves may allow for determination of rock properties such as fracture density and orientation, Poisson's ratio and rock type by crossplotting P-wave and S-wave velocities, and/or by other techniques. Parameters that may characterize anisotropy of media (seismic anisotropy) can include one or more of the Thomsen parameters $\epsilon$, $\delta$ and $\gamma$.

Seismic data may be acquired for a region in the form of traces. In FIG. 1, the technique 140 may include the source 142 for emitting energy where portions of such energy (directly and/or reflected) may be received via the one or more sensors 144. Energy received may be discretized by an analog-to-digital converter that operates at a sampling rate. Acquisition equipment may convert energy signals sensed by a sensor to digital samples at a rate of one sample per approximately 4 ms. Given a speed of sound in a medium or media, a sample rate may be converted to an approximate distance. The speed of sound in rock may be of the order of around 5 km per second. Thus, a sample time spacing of approximately 4 ms would correspond to a sample "depth" spacing of about 10 meters (assuming a path length from source to boundary and boundary to sensor). A trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing scenario is divided by two (to account for reflection), for a vertically aligned source and sensor, the deepest boundary depth may be estimated to be about 10 km (assuming a speed of sound of about 5 km per second).

Figure 2:
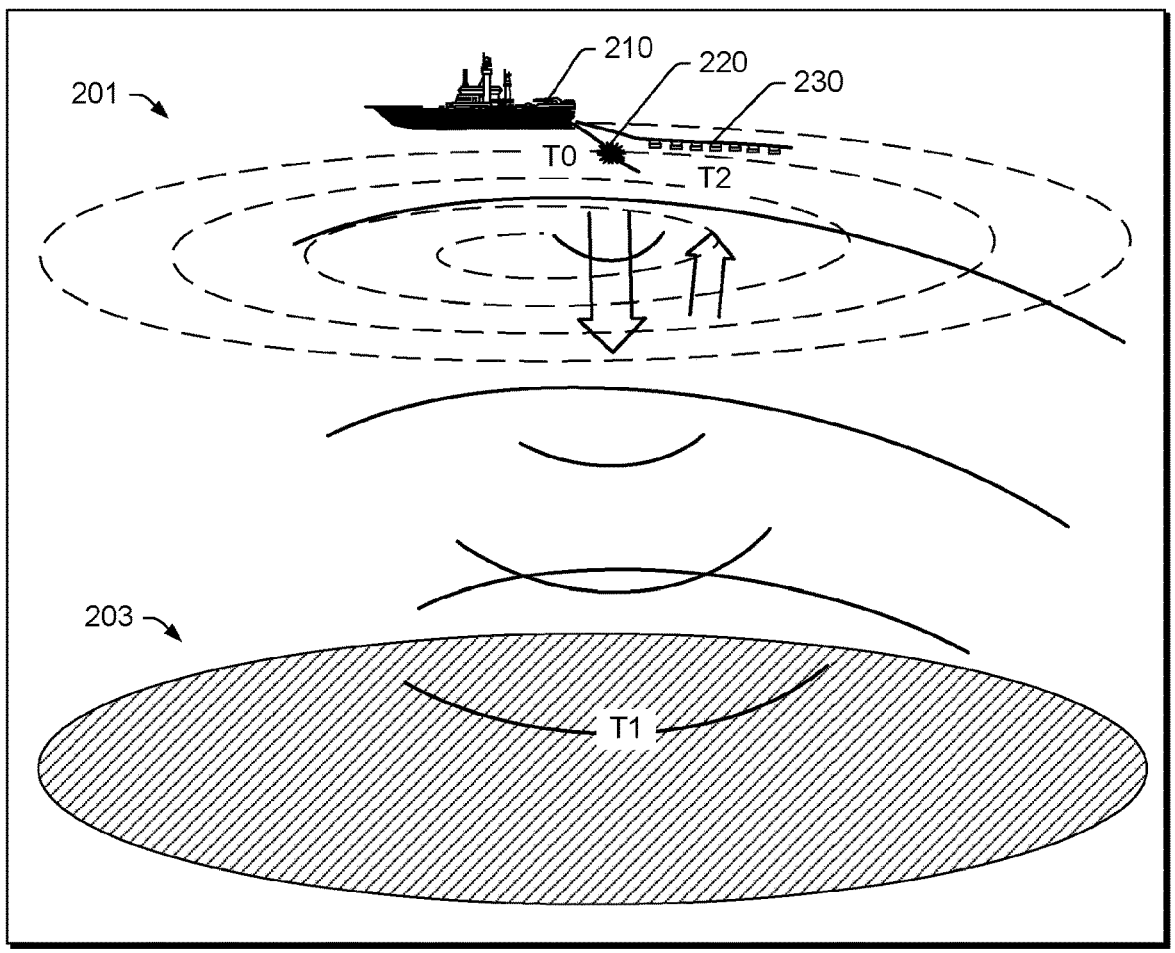
FIG. 2 illustrates multiple reflections and techniques.
Figure 2:
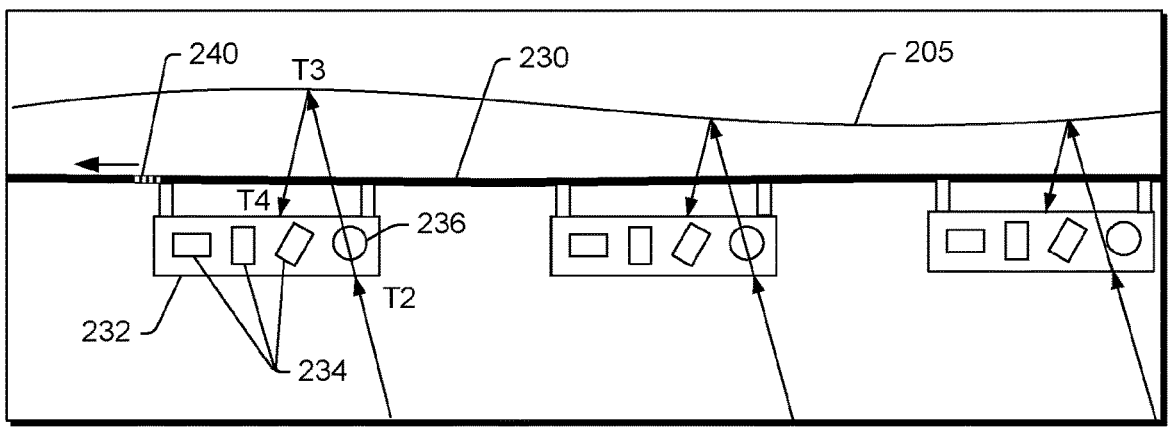
Figure 2:
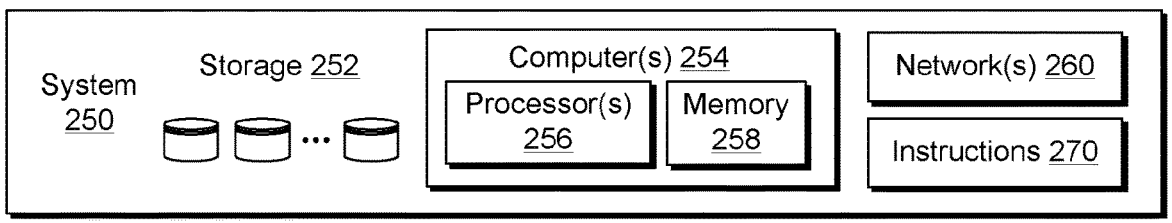

FIG. 2 shows a geologic environment 201 that includes a seabed 203 and a sea surface 205. As shown, equipment 210 such as a ship may tow an energy source 220 and a string of sensors 230 at a depth below the sea surface 205. The energy source 220 may emit energy at a time T0, a portion of that energy may be reflected from the seabed 203 at a time T1 and a portion of that reflected energy may be received at the string of sensors 230 at a time T2.

As mentioned with respect to the technique 140 of FIG. 1, a wave may be a primary or a wave may be a multiple. As shown in an enlarged view of the geologic environment 201, the sea surface 205 may act to reflect waves such that sensors 232 of the string of sensors 230 may sense multiples as well as primaries. In particular, the sensors 232 may sense so-called sea surface multiples, which may be multiples from primaries or multiples of multiples (due to sub-seabed reflections, etc.).

Each of the sensors 232 may sense energy of an upgoing wave at a time T2 where the upgoing wave reflects off the sea surface 205 at a time T3 and where the sensors may sense energy of a downgoing multiple reflected wave at a time T4 (see also the data 160 of FIG. 1 and data 240 of FIG. 2). Sensing of the downgoing multiple reflected wave may be considered noise that interferes with sensing of one or more upgoing waves. An approach that includes summing data acquired by a geophone and data acquired by a hydrophone may help to diminish noise associated with downgoing multiple reflected waves. Such an approach may be employed where sensors may be located proximate to a surface such as the sea surface 205 (arrival times T2 and T4 may be relatively close). The sea surface 205 or a water surface may be an interface between two media; consider an air and water interface. Due to differing media properties, sound waves may travel at about 1,500 m/s in water and at about 340 m/s in air. At an air and water interface, energy may be transmitted and reflected.

Each of the sensors 232 may include at least one geophone 234 and a hydrophone 236. A geophone may be a sensor configured for seismic acquisition, whether onshore and/or offshore, that can detect velocity produced by seismic waves and that can transform motion into electrical impulses. A geophone may be configured to detect motion in a single direction. A geophone may be configured to detect motion in a vertical direction. Three mutually orthogonal geophones may be used in combination to collect so-called 3C seismic data. A hydrophone may be a sensor configured for use in detecting seismic energy in the form of pressure changes under water during marine seismic acquisition. Hydrophones may be positioned along a string or strings to form a streamer or streamers that may be towed by a seismic vessel (or deployed in a bore). Thus, in FIG. 2, the at least one geophone 234 can provide for motion detection and the hydrophone 236 can provide for pressure detection. The data 240 (analog and/or digital) may be transmitted via equipment for processing, etc.

A method may include analysis of hydrophone response and vertical geophone response, which may help to improve a PZ summation by reducing receiver ghost and/or free surface-multiple noise contamination. A ghost may be defined as a reflection of a wavefield as reflected from a water surface (water and air interface) that is located above a receiver, a source, etc. (a receiver ghost, a source ghost, etc.). A receiver may experience a delay between an upgoing wavefield and its downgoing ghost, which may depend on depth of the receiver.

A surface marine cable may be or include a buoyant assembly of electrical wires that connect sensors and that can relay seismic data to the recording seismic vessel. A multi-streamer vessel may tow more than one streamer cable to increase the amount of data acquired in one pass. A marine seismic vessel may be about 75 m long and travel about 5 knots while towing arrays of air guns and streamers containing sensors, which may be located about a few meters below the surface of the water. A so-called tail buoy may assist crew in location an end of a streamer. An air gun may be activated periodically, such as about each 25 m (about at 10 second intervals) where the resulting sound wave travels into the Earth, which may be reflected back by one or more rock layers to sensors on a streamer, which may then be relayed as signals (data, information, etc.) to equipment on the tow vessel.

In FIG. 2, the equipment 210 may include a system such as the system 250. As shown in FIG. 2, the system 250 includes one or more information storage devices 252, one or more computers 254, one or more network interfaces 260 and one or more modules 270. As to the one or more computers 254, each computer may include one or more processors (or processing cores) 256 and memory 258 for storing instructions executable by at least one of the one or more processors. A computer may include one or more network interfaces (wired or wireless), one or more graphics cards, a display interface (wired or wireless), etc. A system may include one or more display devices (optionally as part of a computing device, etc.).

Pressure data may be represented as "P" and velocity data may be represented as "Z"; noting, however, that the vertical component of a measured particle velocity vector may be denoted "V" and that "Z" may refer to a scaled, measured particle velocity. In various equations presented herein, "V" represents a measured velocity and "Z" represents a scaling thereof.

A hydrophone may sense pressure information (P data) and a geophone may sense velocity information (V and/or Z data). A hydrophone may output signals, optionally as digital data for receipt by a system. A geophone may output signals, optionally as digital data for receipt by a system. The system 250 may receive P and V/Z data via one or more of the one or more network interfaces 260 and process such data via execution of instructions stored in the memory 258 by the processor 256. The system 250 may store raw and/or processed data in one or more of the one or more information storage devices 252.

Figure 3:
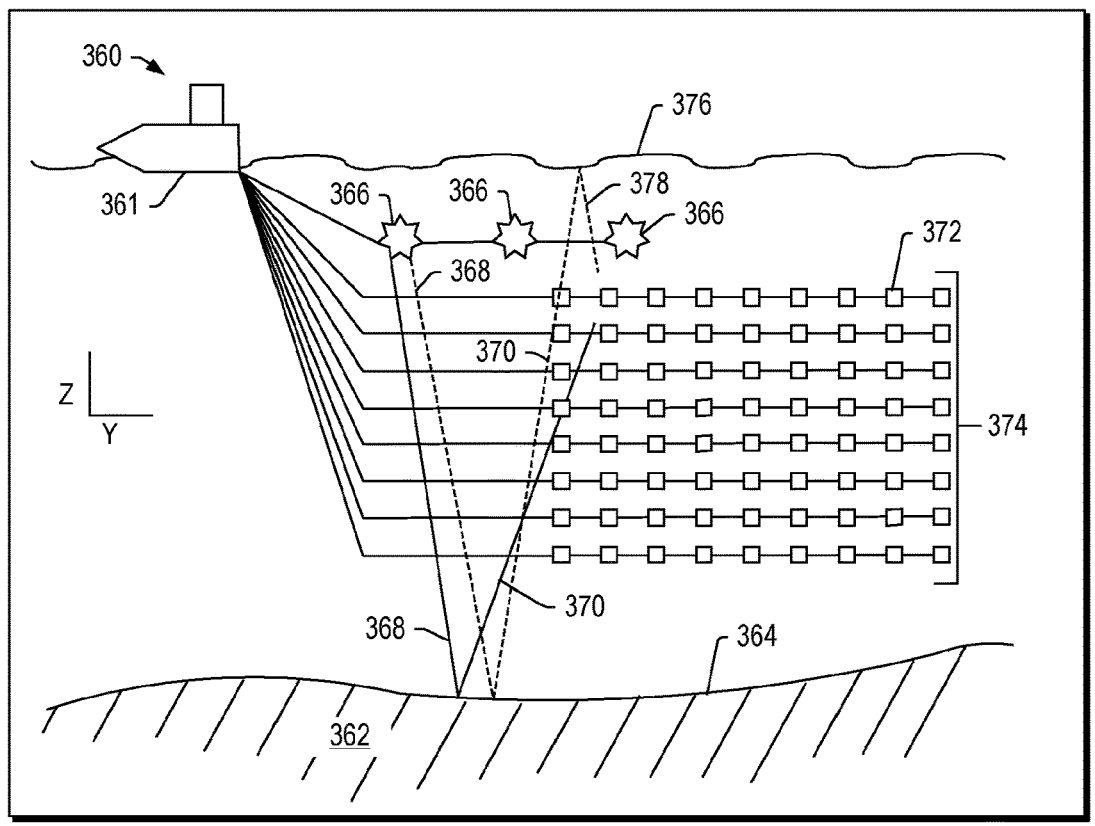
FIG. 3 illustrates a survey technique.
Figure 3:
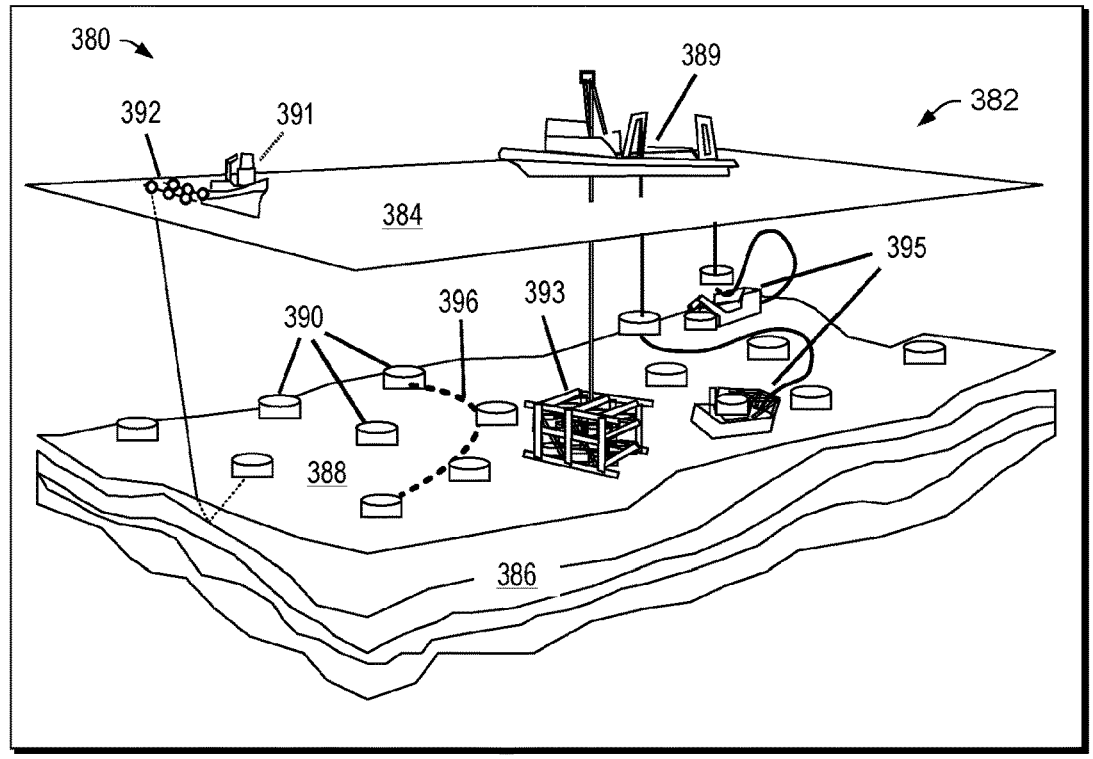

FIG. 3 shows a side view of a marine-based survey 360 of a subterranean subsurface 362 and a perspective view of a marine-based survey 380 of a subterranean subsurface 382.

In the survey 360 of FIG. 3, the subsurface 362 includes a seafloor surface 364. Seismic sources 366 may include marine sources such as vibroseis or air guns, which may propagate seismic waves 368 (energy signals) into the Earth over an extended period of time or at a nearly instantaneous energy provided by impulsive sources. The seismic waves may be propagated by marine sources as a frequency sweep signal. Marine sources of the vibroseis type may initially emit a seismic wave at a low frequency (about 5 Hz) and increase the seismic wave to a higher frequency (about 80 Hz to about 90 Hz or more) over time.

The component(s) of the seismic waves 368 may be reflected and converted by the seafloor surface 364 (as a reflector), and seismic wave reflections 370 may be received by a plurality of seismic receivers 372. Seismic waves may penetrate the subsurface 362 below the seafloor surface 364 and be reflected by one or more reflectors therein and received by one or more of the plurality of seismic receivers 372. As shown in FIG. 3, the seismic receivers 372 may be disposed on a plurality of streamers (a streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like. One or more streamer steering devices may be used to control streamer position.

In one implementation, the seismic wave reflections 370 may travel upward and reach the water/air interface at the water surface 376, a portion of reflections 370 may then reflect downward again (sea-surface ghost waves 378) and be received by the plurality of seismic receivers 372. The sea-surface ghost waves 378 may be referred to as surface multiples. The point on the water surface 376 at which the wave is reflected downward may be referred to as a downward reflection point.

Electrical signals generated by one or more of the receivers 372 may be transmitted to a vessel 361 via transmission cables, wireless communication or the like. The vessel 361 may then transmit the electrical signals to a data processing center. Alternatively, the vessel 361 may include an onboard computing system capable of processing the electrical signals (representing seismic data). Surveys may be of formations deep beneath the surface. The formations may include multiple reflectors, some of which may include dipping events, and may generate multiple reflections (including wave conversion) for receipt by the seismic receivers 372. Seismic data may be processed to generate a seismic image of the subsurface.

A marine seismic acquisition system may tow streamers in the streamer array 374 at an approximate even depth (about 5 m to about 10 m). However, the marine based survey 360 may tow each streamer in streamer array 374 at different depths such that seismic data may be acquired and processed in a manner that avoids the effects of destructive interference due to sea-surface ghost waves. For instance, the marine-based survey 360 of FIG. 3 illustrates eight streamers towed by the vessel 361 at eight different depths. The depth of each streamer may be controlled and maintained using the birds disposed on each streamer.

As to the survey 380 of FIG. 3, a geologic environment 382 is illustrated that includes an air-water surface 384, a formation 386 and a seabed 388 where nodes 390 are positioned on the seabed 384 (according to a grid such as an x, y grid in a Cartesian coordinate system). Equipment may be utilized to position the nodes 390 on the seabed 384 and retrieve the nodes 390 from the seabed 384. Such equipment may include one or more vessels 389, one or more carriers 393 and one or more vehicles 395, which may be autonomous, semi-autonomous, etc. (remotely operated vehicles (ROVs), etc.). A system can include a seismic source vessel 391 that includes one or more seismic sources 392. The seismic source vessel 391 may travel a path while, at times, emitting seismic energy from the one or more sources 392. The nodes 390 can receive portions of the seismic energy, which can include portions that have traveled through the formation 386. Analysis of received seismic energy by the nodes 390 may reveal features of the formation 386.

The one or more sources 392 may be an air gun or air gun array (a source array). A source can produce a pressure signal that propagates through water into a formation where acoustic and elastic waves are formed through interaction with features (structures, fluids, etc.) in the formation. Acoustic waves can be characterized by pressure changes and a particle displacement in a direction of which the acoustic wave travels. Elastic waves can be characterized by a change in local stress in material and a particle displacement. Acoustic and elastic waves may be referred to as pressure and shear waves, respectively; noting that shear waves may not propagate in water. Collectively, acoustic and elastic waves may be referred to as a seismic wavefield.

Material in a formation may be characterized by one or more physical parameters such as density, compressibility, and porosity. In the geologic environment 382 of FIG. 3, energy emitted from the one or more sources 392 can be transmitted to the formation 386; however, elastic waves that reach the seabed 388 will not propagate back into the water. Such elastic waves may be received by sensors of the nodes 390. The nodes 390 can include motion sensors that can measure one or more of displacement, velocity and acceleration. A motion sensor may be a geophone, an accelerometer, etc. As to pressure waves, the nodes 390 can include pressure wave sensors such as hydrophones.

Various nodes of the nodes 390 may optionally be coupled via a cable or cables 396. A cable may include one or more sensors. A cable that extends from, to, between, etc., one or more nodes may optionally include one or more sensors that may include one or more geophones, one or more hydrophones, etc.

The nodes 390 can include sensors for acquiring seismic wavefield information at the seabed 388. Each of the nodes 390 can include one or more hydrophones and/or one or more motion sensors (one or more geophones, one or more accelerometers, etc.).

A node can include circuitry that can include circuitry that can digitize (analog to digital conversion ADC circuitry) and record signals (a microcontroller, a processor, etc., operatively coupled to memory). Each of the nodes 390 can include a housing, sensors, one or more microcontrollers or processors, one or more batteries, memory, ADC circuitry, a compass, communication circuitry, etc. Various components of a node may be operatively coupled via wires, connectors, etc. A node can include one or more circuit boards (printed circuit boards, etc.) that can provide for electrical connections between various components, etc.

Figure 4:
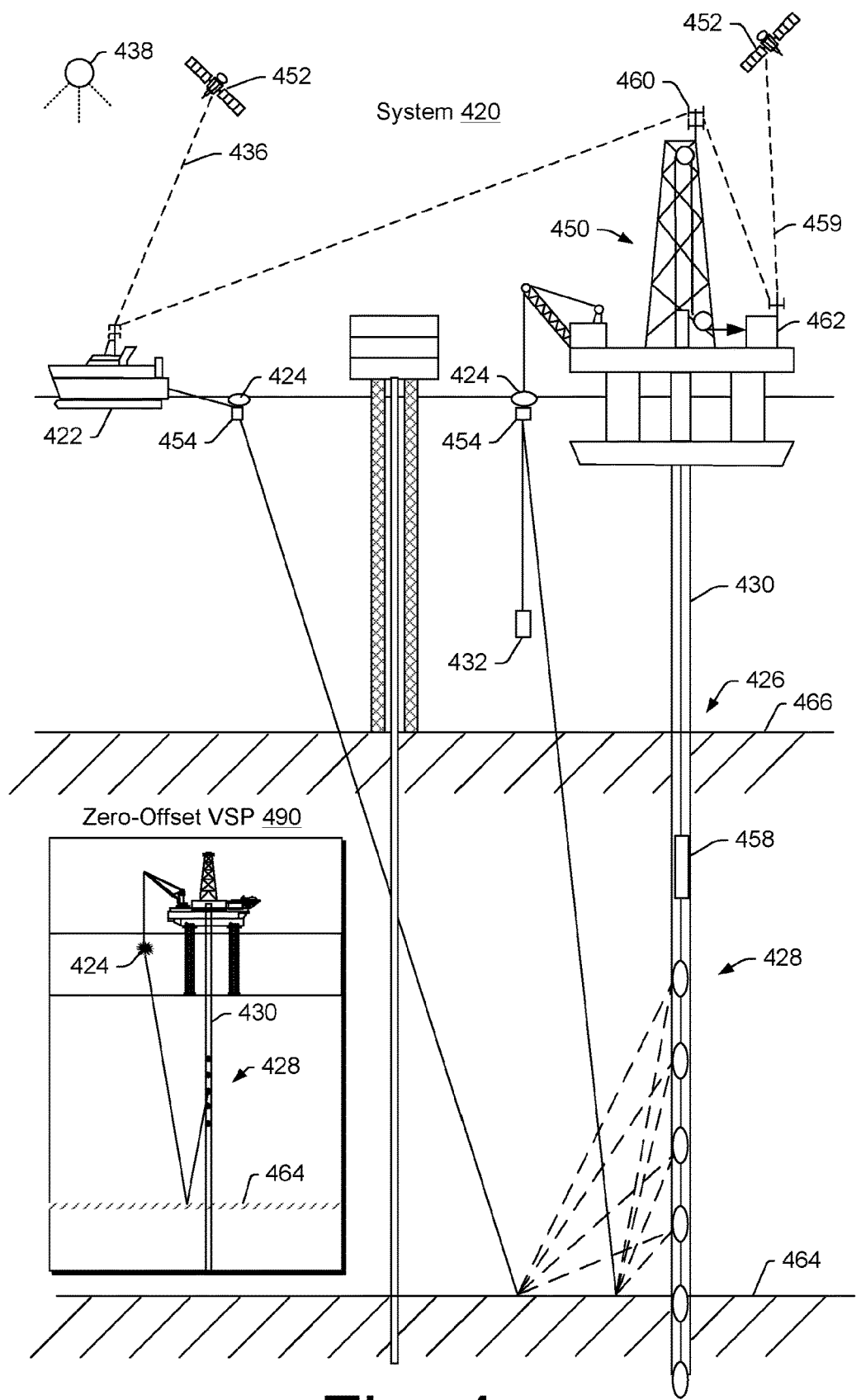
FIG. 4 illustrates a system.

FIG. 4 shows a system 420 in which one or more vessels 422 may be employed to enable seismic profiling, three-dimensional vertical seismic profiling (VSP) or rig/offset vertical seismic profiling (VSP). In FIG. 4, the system 420 is illustrated as including a rig 450, the vessel 422, and one or more acoustic receivers 428 (a receiver array). A vessel may include a source 424 (or source array) and/or the rig 450 may include a source 424 (or source array).

The vessel 422 may travel a path or paths where locations may be recorded through the use of navigation system signals 436. Such signals may be associated with a satellite-based system that includes one or more satellites 452 and 438. The satellite 438 may be part of a global positioning system (GPS), which may be implemented to record position, speed, direction, and other parameters of the vessel 422. One or more satellites, communication equipment, etc. may be configured to provide for VSAT communications, VHF communications, UHF communications, etc.

In FIG. 4, the acoustic receivers 428 may be part of a data acquisition system 426 that may be deployed in borehole 430 via one or more of a variety of delivery systems, such as wireline delivery systems, slickline delivery systems, and other suitable delivery systems. The acoustic receivers 428 may be communicatively coupled with processing equipment 458, which may be positioned at a downhole location. The processing equipment 458 may include a telemetry system for transmitting data from acoustic receivers 428 to additional processing equipment 462 located at the surface on the rig 450 and/or vessels 422. Information acquired may optionally be transmitted (see signals 459).

Depending on the specifics of a given data communication system, processing equipment 462 may include a radio repeater 460 and/or one or more of a variety of other and/or additional signal transfer components and signal processing components. The radio repeater 460 along with other components of processing equipment 462 may be used to communicate signals such as UHF and/or VHF signals, between vessels (the vessel 422 and one or more other vessels) and the rig 450 to enable further communication with downhole data acquisition system 426.

The acoustic receivers 428 may be coupled to the surface processing equipment 462 via one or more wire connections; noting that additionally or alternatively wireless and/or optical connections may be employed.

The surface processing equipment 462 may include a synchronization unit to assist with coordination of emissions from one or more sources (optionally dithered (delayed) source arrays). In such a scenario, coordination may extend to one or more receivers (consider the acoustic receivers 428 located in borehole 430). A synchronization unit may use coordinated universal time, optionally employed in cooperation with a global positioning system (to obtain UTC data from GPS receivers of a GPS system).

FIG. 4 illustrates equipment for performing seismic profiling that can employ simultaneous or near-simultaneous acquisition of seismic data. The seismic profiling may include three-dimensional vertical seismic profiling (VSP) but other applications may utilize rig/offset vertical seismic profiling or seismic profiling employing walkaway lines. An offset source may be provided by the source 424 located on the rig 450, on the vessel 422, and/or on another vessel or structure (stationary and/or movable from one location to another location).

A system may employ one or more of various arrangements of a source or sources on a vessel(s) and/or a rig(s). As shown in FIG. 4, the acoustic receivers 428 of downhole acquisition system 426 are configured to receive the source signals, at least some of which are reflected off a reflection boundary 464 located beneath a sea bottom 436. The acoustic receivers 428 may generate data streams that are relayed uphole to a suitable processing system such as the processing system 462.

While the acoustic receivers 428 may generate data streams, a navigation system may determine a real-time speed, position, and direction of the vessel 422 and also estimate initial shot times accomplished via signal generators 454 of the appropriate source 424 (or source array). A source controller may be part of the surface processing equipment 462 (located on the rig 450, on the vessel 422, or at other suitable location) and may be configured with circuitry that can control firing of acoustic source generated signals so that the timing of an additional shot time (optionally a shot time via a slave vessel) may be based on an initial shot time (a shot time via a master vessel) plus a dither value.

A synchronization unit of the surface processing equipment 462, may coordinate firing of dithered acoustic signals with recording of acoustic signals by the downhole acquisition system 426. A processor system may be configured to separate a data stream of the initial shot and a data stream of the additional shot via a coherency filter. An approach may employ simultaneous acquisition and/or may not perform separation of the data streams. In such cases, the dither may be effectively zero.

After an initial shot time at T=0 (T0) is determined, subsequent firings of acoustic source arrays may be offset by a dither. The dithers may be positive or negative and sometimes created as pre-defined random delays. Use of dithers facilitates the separation of simultaneous or near-simultaneous data sets to simplify the data processing. The ability to have acoustic source arrays fire in simultaneous or near-simultaneous patterns reduces the overall amount of time used for three-dimensional vertical seismic profiling source acquisition. This, in turn, may reduce rig time. As a result, the overall cost of the seismic operation may be reduced, rendering the data intensive process much more accessible.

If acoustic source arrays used in the seismic data acquisition are widely separated, the difference in move-outs across the acoustic receiver array of the wave fields generated by the acoustic sources can be sufficient to obtain a relatively clean data image via processing the data. However, even when acoustic sources are substantially co-located in time, data acquired a method involving dithering of the firing times of the individual sources may be processed to a formation image; consider taking advantage of the incoherence of the data generated by one acoustic source when seen in the reference time of another acoustic source.

Also shown in FIG. 4 is an inset of a zero-offset vertical seismic profile (VSP) scenario 490. In such a scenario, an acquisition geometry may be limited to an ability to position equipment that is physically coupled to the rig 450. As shown, for given the acquisition geometry, there may be no substantial offset between the source 424 and bore 430. In such an scenario, a zero-offset VSP may be acquired where seismic waves travel substantially vertically down to a reflector (see the layer 464) and up to the receiver 428, which may be a receiver array. Where one or more vessels are employed (see the vessel 422), one or more other types of surveys may be performed. A three-dimensional VSP may be performed using a vessel.

Seismic sampling in a seismic sensor network (wired and/or wireless) can include many seismic sensors. Analog output of a sensor can be converted to digital form via an analog to digital converter (ADC), which may be operatively coupled to a digital signal processing (DSP) unit (a DSP chip, a microcontroller, a processor, etc.).

Sampling can occur according to a clock frequency, which may drift over time relative to a data transmission line clock that may be assumed to act as a reference clock. Digital data may be transmitted to a centralized recording unit. Individual sampling ADC/DSP units may be phase-synchronized to a data transmission line clock via an electronic phase-locked loop (PLL). PLL circuitry can include an oscillator that generates a periodic signal and a phase detector that compares the phase of that signal with phase of an input periodic signal and circuitry that adjusts the oscillator to keep the phases matched. In such an approach, bringing the output signal back toward the input signal for comparison provides a feedback loop (output is fed back toward the input forming a loop).

A sampling clock, a data transmission clock, etc., may experience jitter, which can be a deviation from true periodicity of a presumed periodic signal (in electronics and/or communications) in relation to a reference clock source (a master clock, atomic clock, etc.). Jitter may be observed in characteristics such as frequency of successive pulses, signal amplitude, phase of periodic signals, etc.

In analog to digital and digital to analog conversion of signals, sampling may be assumed to be periodic with a fixed period as to time between samples. A clock may experience jitter. Where there is jitter present on a clock signal to an analog to digital converter or a digital to analog converter, the time between samples can vary and instantaneous signal error can arise. Error can be proportional to slew rate of a desired signal and an absolute value of clock error. Where a system includes multiple clocks, deviations of individual clocks, including differences in such deviations, can affect the system (harmonization of data, etc.).

In seismic acquisition, phase synchronize of sampling performed by sampling units can be beneficial. Such synchronization may optionally be performed in a manner where it is decoupled from transmission of data (decoupling of transmission and sampling as to clocks). Such an approach may aim to output sampling frequency of individual signal processing units in a phase synchronized manner with a data transmission line clock.

Various systems may be suitable for implementation in land- and/or marine-seismic surveying. Various methods may be suitable for implementation in land- and/or marine-seismic surveying. A land seismic survey and/or a marine seismic survey may include sensor units that can be positioned in a manner where such positions and/or sensor units may be considered to be nodes (array nodes, grid nodes, etc.). A land seismic survey can include land sensor units, which may be referred to as sensor nodes. A marine seismic survey can include seabed (sea floor) sensor units, which may be referred to as sensor nodes.

A system can include geophones and/or hydrophones. A system can include one or more different types of sensors where a sensor can include a clock and/or output information that may be subject to processing (via an ADC, etc.) that is at least in part clock-based (as to sampling, time stamping, etc.).

Sampling can be decoupled from data transmission. An individual ADC/DSP unit can include its own clock that is not phase-locked by an electronic device (electronic PLL) to a data transmission line. Such an approach may allow for acquisition and transmission without an electronic PLL, which may reduce cost, be more robust, be more flexible, etc., for seismic data acquisition systems. Such an approach may be referred to as a time decoupling approach as to data acquisition and data transmission (a PLL free approach).

A system may be wireless as to communications between vibrators (seismic energy sources), seismic sensors, base stations, and a recording station. A system may utilize a combination of wired and wireless communication technologies. A marine system may utilize towing cables, distance cables, etc., to deploy seismic sources and sensors, etc. A vibrator may be a mechanical source that delivers vibratory seismic energy to the Earth for acquisition of seismic data. A vibrator may be mounted on a vehicle (a truck, etc.). A seismic source or seismic energy source may be one or more types of devices that can generate seismic energy (an air gun, an explosive charge, a vibrator, etc.).

Vibratory seismic data can be seismic data whose energy source is a vibrator that may use a vibrating plate to generate waves of seismic energy. The frequency and the duration of emitted energy can be controllable; frequency and/or duration may be varied according to one or more factors (terrain, type of seismic data desired, etc.).

A vibrator may emit a linear sweep of a duration that is of the order of seconds (at least seven seconds, etc.) beginning with high frequencies and decreasing with time (downsweeping) or going from low to high frequency (upsweeping). Frequency may be changed (varied) in a nonlinear manner (certain frequencies are emitted longer than others, etc.). In various vibrator scenarios, resulting source wavelet can be one that is not impulsive. Parameters of a vibrator sweep can include start frequency, stop frequency, sweep rate and sweep length.

Where a vibrator sweep is approximately 12 seconds long, then each reflection event can spans about 12 seconds in the raw, uncorrelated data (raw measurement data, RMD) where various reflection events can overlay each other. Data may be reduced to an interpretable form by a cross-correlation of the known input sweep with the raw data recorded at the receiver stations (receivers). Where a correlation process finds a replication of the input sweep, it can produce a compact symmetrical correlation wavelet centered on the long reflection event. In this correlated form, data tend to exhibit a relatively high signal-to-noise ratio, and reflection events tend to be robust wavelets spanning a few tens of milliseconds.

A vibrator may be employed in land acquisition surveys for areas where explosive sources may be contraindicated (via regulations, etc.). More than one vibrator can be used simultaneously (in an effort to improve data quality, etc.).

Seismic data acquisition can include 3D and/or 4D land seismic data acquisition, such as during exploration for underground hydrocarbon-bearing reservoirs, or monitoring existing reservoirs. Electromagnetic signals may be used to transfer data to and/or from the sensor units, to transmit power, and/or to receive instructions to operate the sensor units.

Figure 5:
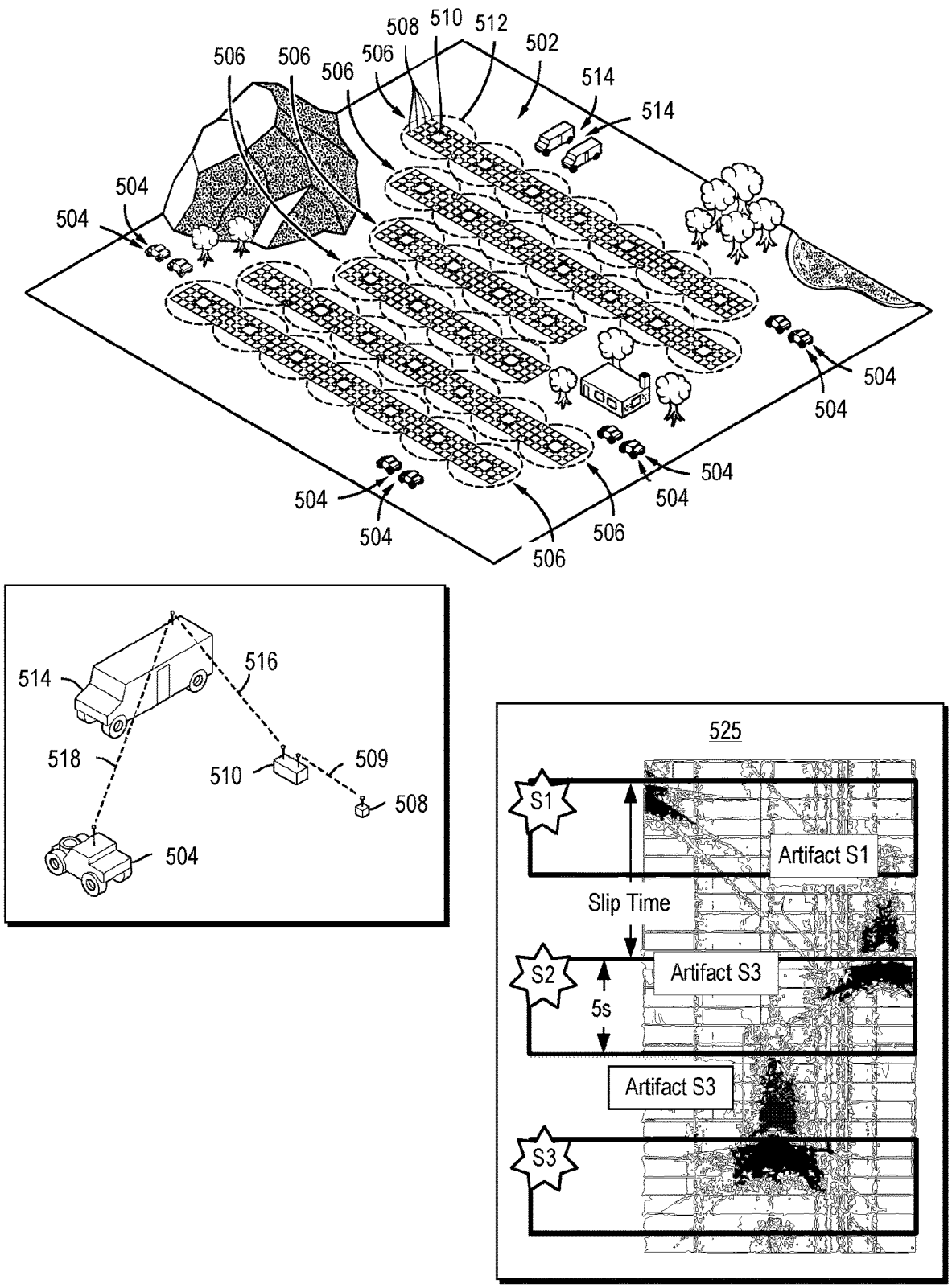
FIG. 5 illustrates a survey technique, associated equipment and a plot of data.

A simplified schematic view of a land seismic data acquisition system is illustrated in FIG. 5. As shown, an area 502 to be surveyed may or may not have physical impediments to direct wireless communication between a recording station 514 (which may be a recording truck or optionally trucks, etc.) and a vibrator 504. A plurality of vibrators 504 may be employed, as well as a plurality of sensor unit grids 506, each of which may have a plurality of sensor units 508 (sensor unit nodes, etc.).

As illustrated in FIG. 5, approximately 24 to about 28 sensor units 508 may be placed in a vicinity around a base station 510. The number of sensor units 508 associated with each base station 510 may vary as to one or more survey parameters, types of surveys, etc. Circles 512 indicate an approximate range of reception for each base station 510.

In the system of FIG. 5, the plurality of sensor units 508 may be employed in acquiring and/or monitoring land-seismic sensor data for the area 502 and transmitting the data to the one or more base stations 510. Communications between the vibrators 504, the base stations 510, the recording station 514, and the seismic sensors 508 may be wireless (at least in part via air for a land-based system; or optionally at least in part via water for a sea-based system).

FIG. 5 also shows equipment with respect to a wireless data network where the wireless data network can include the seismic sensors 508 transmitting at least a portion of seismic data they sense to the one or more base stations 510 via a first wireless link 509, which in turn can transmit at least some data they receive to the recording station 514 via a second wireless link 516. Commands may be sent from recording station 514 to the vibrators 504 via the wireless link 518, and, to the extent data is exchanged between the vibrators 504 and the recording station 514, the wireless links 518 may be considered part of the wireless data network.

Figure 8:
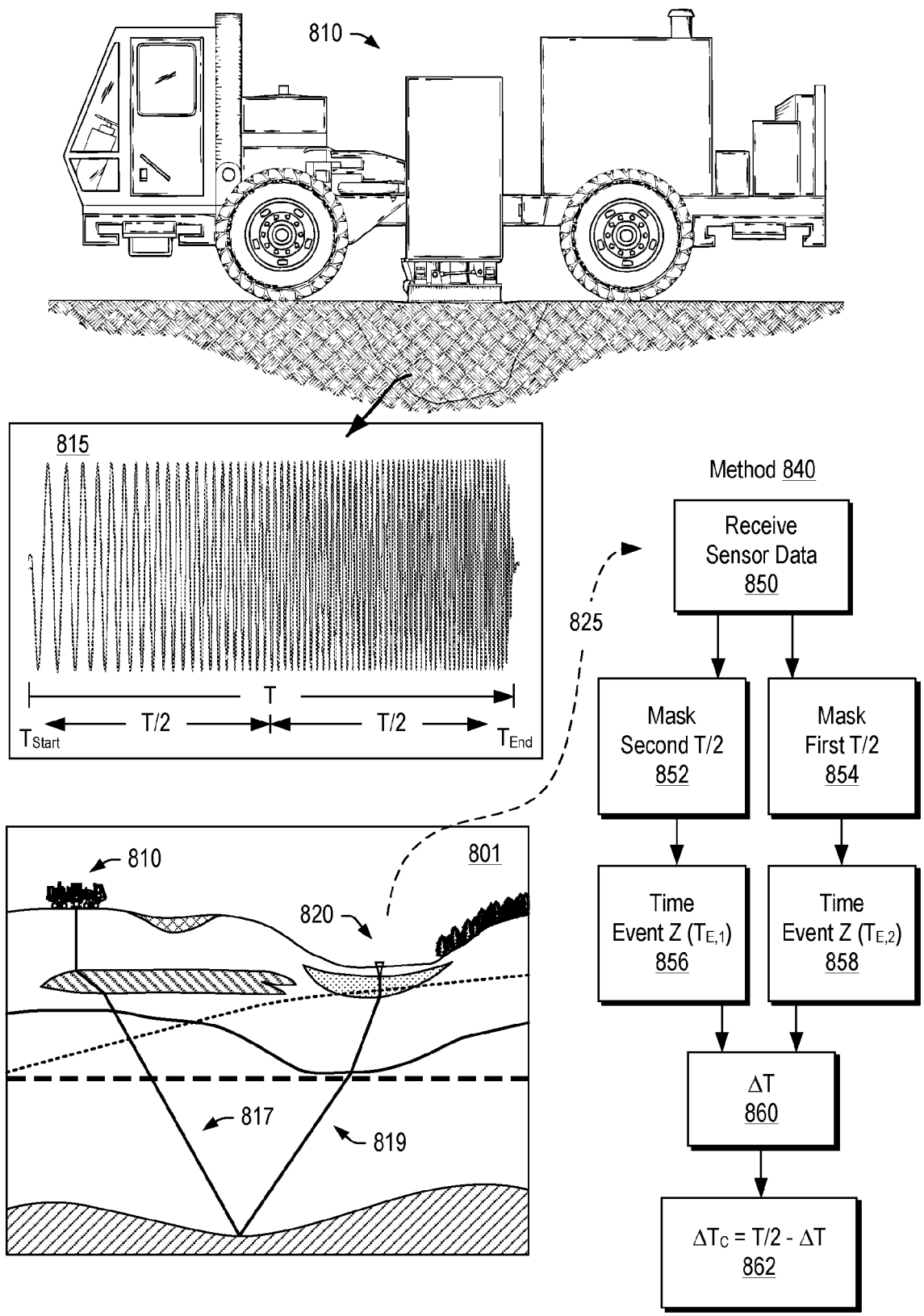
FIG. 8 illustrates equipment in a geologic environment and a method.

FIG. 5 further shows a plot of data 525 for a simultaneous vibroseis survey that included seismic energy emissions S1, S2 and S3 (see also frequency sweep of duration T of FIG. 8). Specifically, the data are plotted as a correlated record from a simultaneous vibroseis acquisition where artifacts of an air blast from S1 (cross airwave), chimney noise from S3 and harmonic from S3 (cross harmonic) are labeled along with a slip time and a record length for S2 (about 5 seconds). In a vibroseis survey, various types of noise may be present such as chimney noise, which may be seen when data are correlated with a survey sweep and visualized (as a column). As to other types of noise, these may include ground-roll and/or air-blast types of noise. In a slip-sweep operations data can be recorded as a mother record where the interval between two consecutive sweeps is referred to as the slip time (see S1 and S2 and slip time).

A frequency sweep of seismic energy as emitted by a seismic energy source (vibrator, etc.) can travel into a geologic environment and can be reflected at least in part by material in the geologic environment (consider a reflector as an interface between layers of contrasting acoustic properties). In a record of sensed seismic energy, as acquired by one or more sensor units, the reflector can be an event that exists as a feature in the record (traces, etc.) as associated with various frequencies of the frequency sweep, which is spread across a duration in time. In such an approach, the record can include information associated with the reflector as "imaged" by a plurality of frequencies of the frequency sweep. As the frequency sweep occurs over a duration in time, the event can appear in the record at a plurality of times.

Figure 6:
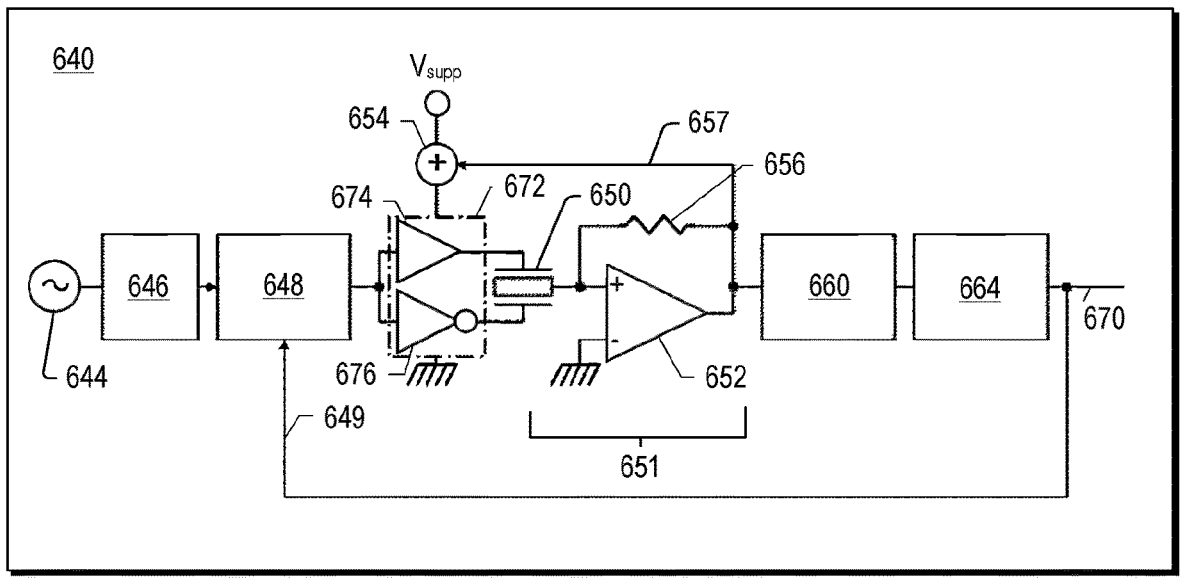
FIG. 6 illustrates an accelerometer and a pressure sensor.
Figure 6:
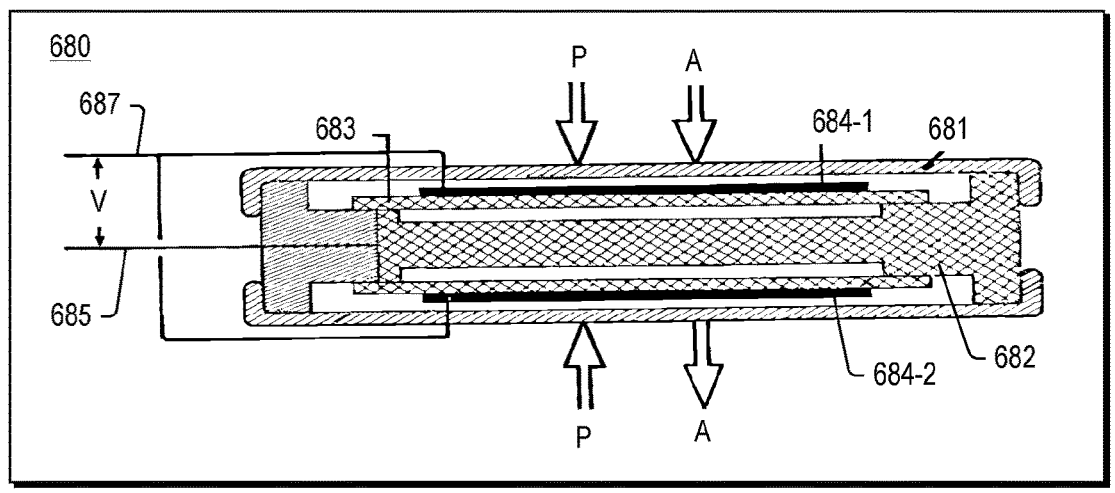

FIG. 6 shows an accelerometer 640 and a pressure sensor 680. One or more of the accelerometers 640 may be included in a velocity sensor package. One or more of the pressure sensors 680 may be included in a pressure sensor package. Sensor equipment can include a plurality of pressure sensors and/or a plurality of particle velocity sensors.

As shown in FIG. 6, the accelerometer 640 can include a system clock generator 644, a jitter filter 646, a pulse generator 648, a return connection 649, a sensor 650, a charge amplifier 651, an adder 654, a resistor 656, an adder connection 657, an amplitude detector 660, a loop controller 664, a digital output 670 and logic 672 with complimentary drivers 674 and 676.

In FIG. 6, the accelerometer 640 can include a capacitive MEMS-based sensor. As illustrated in FIG. 6, the sensor 650 can include an armature and a pair of fixed position electrodes attached to the armature. A sensor may include a differential capacitor, in which a mobile electrode moves along a sensitive axis in response to an external acceleration.

The accelerometer 640 may be subjected to inertial forces caused by an external acceleration where a proof mass may be kept in an equilibrium position by electrostatic forces controlled via feedback circuitry. In FIG. 6, the amplitude detector 660 and the loop controller 664 can provide a substantially high gain where residual movement of a mobile mass with respect to its equilibrium position may be kept close to a null point. In such an approach, magnitude and direction of a net restoring force can be a difference between attractive forces working in opposite directions.

Sampling noise can be kT/C noise (thermal noise), which can be introduced by switching and can degrade a dynamic range of a sensor. In FIG. 6, the accelerometer 640 can include the charge amplifier 651 configured with an input terminal that is continuously connected to a mobile electrode (during times in which the sensor 650 receives both actuation and activation voltages). In such an approach, sampling noise can be reduced in comparison to circuitry that does not include such a configuration of components.

In FIG. 6, the accelerometer 640 can include a constant charge drive for the sensor 650. The charge amplifier 651 of the accelerometer 640 can modulate, or adjust, actuation voltage based on a proof mass movement, which may thereby increase available signal-to-noise ratio. As shown in FIG. 6, a feedback network can be associated with the charge amplifier 651. An output terminal of the amplifier 652 can be connected via the adder connection 657 to the adder 654, which can combine an output signal from the amplifier 652 with a supply voltage $V_{supp}$. In such an arrangement, the supply voltage that is applied to the logic 672, from the adder 654, can be modulated according to a sensed signal that as available at the output terminal of the amplifier 652; and as a result, the actuation force can be independent of the proof mass movement.

A sensor package may include a three component (3C) particle motion sensor assembly consider a 3C accelerometer assembly. Such an assembly may acquire inline (x), crossline (y) and vertical (z) particle acceleration measurements; consider an accelerometer assembly that includes microelectromechanical system (MEMS) sensor units that sense accelerations along respective inline (x), crossline (y) and vertical (z) axes. In a package, orientations of MEMS sensor units may be appropriately varied for purposes of alignment with corresponding axes. A 3C accelerometer assembly may include one or more clocks (for generation of clock signals, etc.). A 3C accelerometer assembly may include a single clock or three individual clocks. A 3C accelerometer assembly may include synchronization circuitry where the assembly includes multiple clocks (to reduce deviations between the clocks).

In FIG. 6, as shown in an approximate cross-sectional view, the pressure sensor 680 can include a sheath 681, a core 682, an electrode 683 and at least one piezoelectric element 684-1 and 684-2, which may be a ceramic-based piezoelectric element or elements. As shown, a potential (V) may be measured across wires 685 and 687 where the potential (V) varies based at least in part on response of the at least one piezoelectric element 684-1 and 684-2 to external forces such as pressure (P) and/or acceleration (A). The potential (V) may be input to an analog to digital converter that can convert potential as an analog signal to a digital form. A pressure sensor may include circuitry that can output current where an amount of current is related to pressure. A clock may be utilized as to sampling and/or for one or more other purposes associated with pressure sensing.

A piezoelectric material can produce an electrical potential when it is subjected to physical deformation. A piezoelectric material can include a crystalline structure (quartz, tourmaline, a poly-crystalline ceramic, etc.). A lead zirconate titanate (PZT) may be utilized.

A pressure sensor can include a plate of piezoelectric ceramic placed on an elastic electrode. In such an approach, the active element can be deformed by pressure variations in surrounding media and produce a voltage collected between the electrode and a terminal bonded to the other face. The electrode can rest on a metallic core that supports its ends and that may also limit its maximum deformation (to avoid damage to the ceramic).

As the active element has mass, it can produce a voltage when it is subjected to acceleration. In off-shore operations (water-based operations), with boat movements and waves, a pressure sensor can be subjected to accelerations, which can create noise in the absence of application of a compensation technique. To diminish the effect of acceleration, a pressure sensor can be assembled with elements that may be paired, as shown in FIG. 6 (see elements 684-1 and 684-2 with respect to the direction of acceleration). In such an approach, voltage produced by acceleration can cancel whereas voltage produced by pressure can add.

Figure 7:
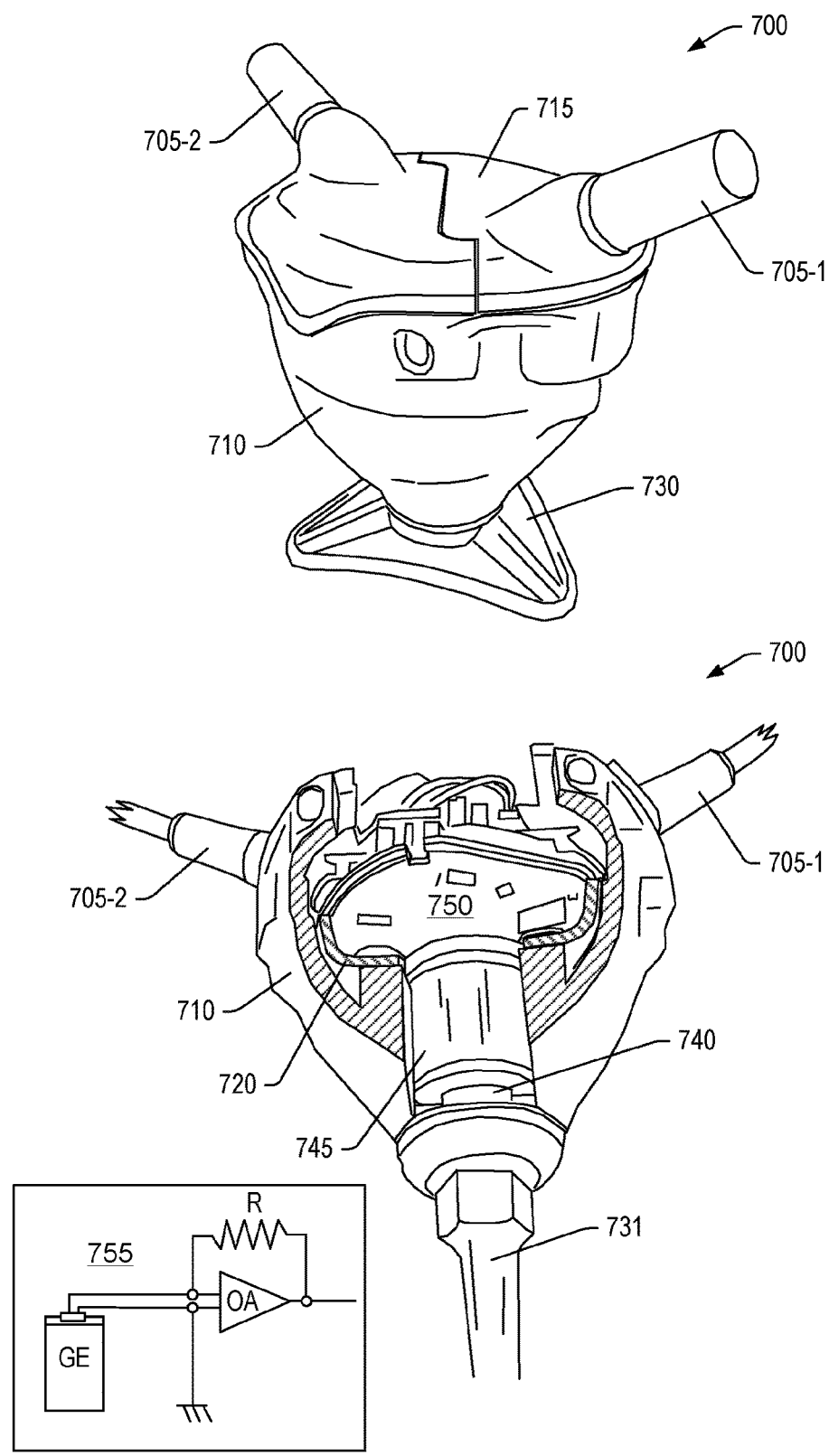
FIG. 7 illustrates a sensor unit.

FIG. 7 shows an assembly 700 that includes cable connectors 705-1 and 705-2, a housing 710, a cover 715, a ground shield 720, a base 730 or a spike 731, a sensor driver 740, a sensor assembly 745, and a circuitry board 750. The assembly 700 can include one or more clocks (sensor clocks, etc.).

The circuitry board 750 can be a geophone accelerometer circuitry board (a GAC board), which can include or be operatively coupled to a clock of the assembly 700. The assembly 700 can include a seismic system geophone accelerometer (a seismic system GAC) as the sensor assembly 745 that can sense motion (as operatively coupled to the sensor driver 740) where circuitry may be utilized to reduce signal distortion and/or increase bandwidth (consider an approximately 18 Hz geophone with additional electronic circuitry).

As to the simplified circuitry diagram 755 of FIG. 7, a geophone element (GE) can be connected across an input of an operational amplifier (OpAmp, labeled OA) circuit. In such an approach, a feedback resistor (R) can connect the OpAmp circuit output to the geophone element. If a GAC coil moves within its magnetic field, the voltage it generates is detected by the OpAmp circuit, which responds by sending a current back through the feedback resistor (R), which can act to damp coil movement. As force to hold the coil stationary can be proportional to the coil acceleration, the output voltage of the circuitry represents earth motion expressed as acceleration. As coil movement is reduced by more than an order of magnitude, the associated signal distortion may also be reduced by more than an order of magnitude. A negative feedback loop can widen the pass-band of a signal that it controls. An approximately 18 Hz tilt-indifferent geophone may be utilized as an accelerometer with an about −3 dB point below about 2 Hz. In such an approach, choice of an about 18 Hz geophone may be suitable due to stiffness of springs and reduced coil displacement. Such an arrangement may allow for operation in various orientations while achieving some amount of optimization as to characteristics of a pass-band.

The assembly 700 can include electrical shock protection circuitry; such an assembly can include conductive and/or non-conductive structural features and/or circuitry that can mitigate effects of lightning strikes (at or near the assembly 700, etc.). An assembly can include one or more gas discharge tubes (GDTs) and/or one or more thyristor surge protection devices (TSPDs) as part of a protection system.

The assembly 700 may be utilized in a field where a plurality of such assemblies is positioned according to a grid plan, etc., to form an array. Various assemblies may be operatively coupled via one or more cables. A cable or cables may be coupled to the cable connectors 705-1 and/or 705-2. In a field system, an individual assembly or sensor unit may be considered to be a node (a node of a grid, a node of an array, etc.).

The assembly 700 of FIG. 7 may be a UNIQ™ sensor unit (Schlumberger Limited, Houston, Tex.). An assembly or sensor unit may include circuitry that can output samples at intervals of 1 ms, 2 ms, 4 ms, etc. An assembly or sensor unit can include an analog to digital converter (ADC) such as a 24-bit sigma-delta ADC. An assembly or sensor unit can include synchronization circuitry such as GPS synchronization circuitry with an accuracy of about plus or minus 12.5 microseconds. An assembly or sensor unit can include circuitry for sensing of real-time and optionally continuous tilt, temperature, humidity, leakage, etc. An assembly or sensor unit can include calibration circuitry, which may be self-calibration circuitry.

The assembly 700 of FIG. 7 may be about 90 mm in height, about 90 mm in width and about 80 mm in depth. A base may be a spike, a tripod or other type of base. The assembly 700 of FIG. 7 may have a mass of about 0.4 kg. The assembly 700 of FIG. 7 may have a power consumption of the order of about 100 mW and an operating voltage in a range of about plus or minus 25 V to about plus or minus 40 V.

A field system that includes assemblies such as the assembly 700 of FIG. 7 may include one or more power insertion units (PIUs) such as the UNIQ™ PIU (Schlumberger Limited, Houston, Tex.). Such a unit may provide for power and/or data routing for a plurality of sensor units (up to hundreds of sensor units) and timing synchronization (via a clock and/or GPS). Such a unit may include data capacity of about 75 channels or more (for sampling intervals of about 1 ms, 2 ms, 4 ms, etc.).

A field system that includes assemblies such as the assembly 700 of FIG. 7 may include a source control unit such as an integrated source control (ISC) or integrated point-receiver land seismic system unit (consider the UNIQ™ ISC, Schlumberger Limited, Houston, Tex.). A source control unit can directly and/or indirectly provide for control of seismic energy sources. A source control unit may be operatively coupled to a plurality of seismic energy sources (tens or hundreds of seismic energy sources).

A source control unit can include a clock such as a rubidium atomic clock. A source control unit can include GPS circuitry (for GPS time-stamping, etc.), which may include satellite based augmentation circuitry. A source control unit can include communication circuitry such as VHF radio, broadband radio, etc.

A field system can include sensor units that include sensor unit clocks and other units that can include clocks. A clock may be considered to be timing circuitry. A field system can include UNIQ™ sensor units and one or more other units where the sensor units include sensor clocks and where the other units include master clocks. In a field system, a clock or timing circuitry of a PIU may serve as a master clock for a plurality of sensor units.

A field system may utilize GPS time for recording and source synchronization such that time-stamped shot records can be separated out for on-site and/or for remote recording (truck, base camp, etc.).

Raw sensor measurements (RSMs or RMD) from sensor units may be transmitted to a centralized unit (via communication circuitry, communication links, wire cables, fiber optic cables, etc.). Planned and final coordinates, test results, tilt statistics, and environmental data can be transmitted to a recording vehicle/system along with the RSMs, where they may be combined with information from sources and written into the trace headers. Coordinates may be optionally injected into each sensor unit during a layout process (via RFID technology, etc.).

As mentioned, a clock associated with a sensor such as an accelerometer or a pressure sensor may drift over time in that it may differ with respect to another clock, which may be a master clock (a global clock, etc.).

One or more techniques may address issues pertaining to clock drift; consider a method that utilizes dedicated sources and/or another method that utilizes commercial vibrators where such methods can adjust for oscillator clock drift at a processing stage. Where adjustments can be made at a processing stage, an opportunity exists for decoupling to at least some extent consider decoupling of one or more transmission clocks (as associated with data transmission circuitry) and one or more sampling clocks (ADC clocks, etc.).

One or more techniques can be implemented where sensors are distributed as nodes that may define or be defined by a grid such as an x, y grid or other type of grid in a coordinate system (Cartesian, cylindrical (r, Co), spherical, etc.), which may be one dimensional, two dimensional or three dimensional for a particular survey.

A survey may be performed by emitting seismic energy and receiving seismic energy where received seismic energy is stored as data in memory (one or more storage medium that are storage devices) of individual sensors or memory of a storage device that may be coupled to a plurality of sensors in a field (consider a pod of sensors coupled to a common storage device). Data can be harvested after the emissions/reception portion(s) of the survey is(are) performed. For a land-based survey and/or a marine survey (with seabed sensors), the sensors may be interrogated to retrieve data. Such surveys can be cableless and transmissionless with respect to data in that data become available in a post-emission/reception portion or portions by a process that involves interrogating sensors (one-by-one, etc.) to retrieve data stored therein. In such an approach, there may be no real-time transmission of data during an emission/reception portion of a survey. Various techniques can be applied for a system that includes sensors as nodes, which are cableless, and where data are being stored and then harvested at the end of the survey or intermittently such that no real-time transmissions of data are involved. Such an approach, can utilize nodes that can be land nodes and/or seabed nodes.

A method may include synchronizing to a global clock as to data of nodes by having M out of N (M<N) nodes including synchronized clocks and using these during processing to synchronize the data of other, unsynchronized nodes. In such an approach, certain nodes may be "trusted" nodes with respect to timings (time stamps, sampling intervals, etc.). In such an approach, data acquired via "untrusted" nodes may be adjusted during processing (after data transmission).

A method can include utilizing a source's sweep pilot that generates a seismic signal as a source of calculating a node's oscillator drift as to when start of a sweep occurs and where length and composition of the sweep signal are known. In such a method, various time windows in a sweep signal can be used for calculating drift of a local clock (oscillator clock) when processing data for signal arrivals. In such an approach, reflections that have approximately the same travel time independent of frequency may be used (assuming no frequency-dependent velocity dispersion). In such an approach, data can be correlated with different time windows of a common pilot sweep and the generated correlated data sets can be compared to estimate clock drift between the correlated records. In such an approach, where a sweep has been T seconds long and data are correlated in two parts, first with the 1st T/2 seconds (second half masked) and then with the 2nd T/2 seconds (1st part masked), then the time delay between the two can be expected to be T/2 seconds; however, if not, then it can indicate deviation of global and local clocks. A method can include analyzing a difference for one or more of drift, dispersion, etc. Dispersion may be expected to be minimal (negligible) where velocity does not vary substantially with respect to frequency.

FIG. 8 shows a geologic environment 801, equipment 810, a plot 815 of a frequency sweep as generated by the equipment 810, downgoing energy 817 of the frequency sweep, upgoing energy 819 of the frequency sweep, a sensor 820 (a node as in an array or grid), data 825 as being harvested from the sensor 820 (after the sensor 820 has generated the data 825 responsive to sensing the upgoing energy 819 and stored the data 825 in memory of the sensor 820) and a method 840. While FIG. 8 is shown as a land-based survey, various features, actions, etc., may be applied in a marine survey where seabed sensors are employed (see the marine-based survey 380 of FIG. 3).

As shown in the plot 815 of FIG. 8, the frequency sweep includes a start time ($T_{Start}$) and an end time ($T_{End}$) where a duration between these two times is labeled T ($T=T_{End}-T_{Start}$), which may be divided into a first duration T/2 and a second duration T/2. A record length associated with emitted energy and seismic data is shown in the plot 525 of FIG. 5 (see S2 and the record length of about 5 seconds).

As shown in FIG. 8, the method 840 includes a reception block 850 for receiving the sensor data 825 (as harvested from memory of the sensor 820 or sensors that may be in the geologic environment 801 arranged as nodes of a grid, etc.), a mask block 852 for masking a second T/2, a mask block 854 for masking a first T/2, an event block 856 for identifying an event Z and an associated time ($T_{E,1}$) in the sensor data as correlated with the frequency sweep of the first T/2 (mask of second T/2), an event block 858 for identifying the event Z and an associated time ($T_{E,2}$) in the sensor data as correlated with the frequency sweep of the second T/2 (mask of first T/2), a determination block 860 for determining a time difference for the event Z (determining a delta T, $\Delta T$) and a determination block 862 for determining a clock difference ($\Delta T_C$, $\Delta T_C = \Delta T - T/2$). In the method 840, the time difference of the block 860 may be expected to be T/2. Where the time difference is different than T/2, the difference, $\Delta T_C$ ($\Delta T_C = \Delta T - T/2$) can be indicative of drift in a clock or clocks.

The method 840 may be repeated for one or more sweeps where the sweeps may be of a set duration or of multiple durations where the durations are known and can be utilized to window the sweep and mask for purposes of determining times for a common event.

A sweep may be windowed using one or more window lengths and/or using two or more windows; consider a three window approach where a window length is T/3. In such an approach, the method 840 can include three masking/correlation blocks and three time identification blocks. Multiple time differences may be determined, which may be compared to or otherwise analyzed with respect to a "perfect" time duration (no drift scenario or no drift and no dispersion scenario) to uncover drift and/or drift dynamics (characteristics of drift, etc.).

A deviation for reflections that do not suffer substantially from velocity dispersion may be due to drift of a local clock of a sensor unit. Several shots in a receiver gather can be used to make one estimate for clock drift of a receiver unit. A composite sweep can be used with particular properties to provide additional clock information. A special sweep can be a sweep that starts from low frequency to high frequency and then goes back to the starting frequency. Sweeps from various positions can be used to improve the estimate of the drift of a local clock at individual points in time.

A method can include utilizing dedicated acoustic wave generators in fixed positions. In such a method, the generators can generate a sufficient level of acoustic energy intermittently. Such an approach can include generating energy at specific global times departing enough energy into ground to be sensed inside an area by nodes. In such an approach, periodic arrivals can be used to adjust data for drift of an unsynchronized free-running oscillator clock in each node in the processing stage by calculating the drift during each period. In such an approach, clock drift information may be used to resample data for each node (during post-transmission processing, etc.).

A period of time between generations of acoustic waves can be substantially fixed. A process can assume that there is little change in velocity in the ground from a fixed position to a sensor unit or a node inside short time periods. In such an approach, the difference between arrival times of the intermittent acoustic waves emitted by these sources can show an almost constant time that can be used for calculating drift of a local clock in a node relative to a global clock. Drift can be estimated by processing the data and looking for events generated by such sources. Such processing can occur, after transmission of data from nodes to a common unit (a computer, etc.).

A system can include a number of nodes (several percent of a total number of nodes) that are synchronized by a GPS or other technique (radio transmission, etc.). In such a system, the synchronized nodes may be distributed (randomly, regular pattern, etc.) in a survey area and where their synchronized data may be used to synchronize data acquired by various other nodes during data processing (post transmission to a centralized data processing hub).

One or more approaches may be implemented that may utilize acoustic signals to calculate drift of a free-running oscillator clock in a node relative to a global clock (a master clock).

Seismic source sweep energy departed into ground by a vibrator can be used for calculating drift of a local clock. For some modes of propagation, arrivals dispersion in the ground may be negligible. For these events, frequencies can be assumed to travel at approximately the same velocity.

As mentioned, where a sweep is generated over a constant time (with a fixed length in time), it can be used to calculate a node's oscillator clock drift by correlating data several times with different time windows of the sweep. For a sweep of length T (in seconds), data can be correlated once with the first half part of the pilot (2nd part masked) and next with the second half part of the pilot sweep (1st part masked). In such an approach, the same events (in acquired seismic data) may be expected to appear in two correlated sets separated by almost about T/2. In such an approach, deviation from T/2 may be considered to be due to clock drift, excluding estimation inaccuracies and/or velocity dispersion.

Above, the pilot is divided into two parts. A method can include partitioning into N parts to generate N sets of correlated data.

One or more techniques may be utilized to find a time difference estimate for same events correlated by parts of a sweep during processing. A time difference and time drift can be estimated by frequency methods and/or time methods. A ratio of a time difference estimate to an expected time difference from a pilot sweep can, itself, be used to estimate clock drift and to resample data accordingly. A resampling approach that can utilize a ratio is described in U.S. Pat. No. 8,559,271 B2, which is incorporated by reference herein.

A method can include extracting extra information from data sampled by specialized nodes where each of such specialized nodes includes an accurately synchronized sampling clock. In such a method, data from such nodes can be used as a reference when processing unsynchronized data by applying algorithms on data of the synchronized nodes and data of the unsynchronized nodes. Data arrivals in shot gathers may tend to exhibit a regular pattern. Some arrivals may be seen as a straight line or a parabola. In such an approach, a deviation may be related to clock drift. A method can include assessing a plurality of shot gathers to enhance an estimate (statistically, etc.). Recording of global times of emissions of individual sweeps by individual vibrators may be used to generate an estimate of global time in data.

A system may include dedicated acoustic sources that are positioned at known locations and that can generate intermittent/periodic signals for synchronization of nodes. A signal can be a series of tappings with particular frequency content. A signal can be a chirp, a pseudorandom sequence or another type of signal. A signal can be sent periodically/intermittently and at specific global times. In such an approach, the signal may be used for calculating a node's oscillator drift and adjusting drift by resampling data of the node during processing.

A method can include synchronizing signals from sources with fixed positions, which may be recognized during processing by correlation to a known pattern or patterns (or other technique).

A method can include determining a ratio of the difference of arrival times between two intermittent signals on sampled data at each node to the interval between the two transmission times from the source to show drift of a clock.

Signal emissions from several sources at several positions may be used to generate an estimate of drift. In such an approach, several specialized nodes can include globally synchronized clocks and data from such nodes can be used as a reference when processing data of unsynchronized nodes by applying algorithms on data of the synchronized nodes and at least some of the unsynchronized ones.

Figure 9:
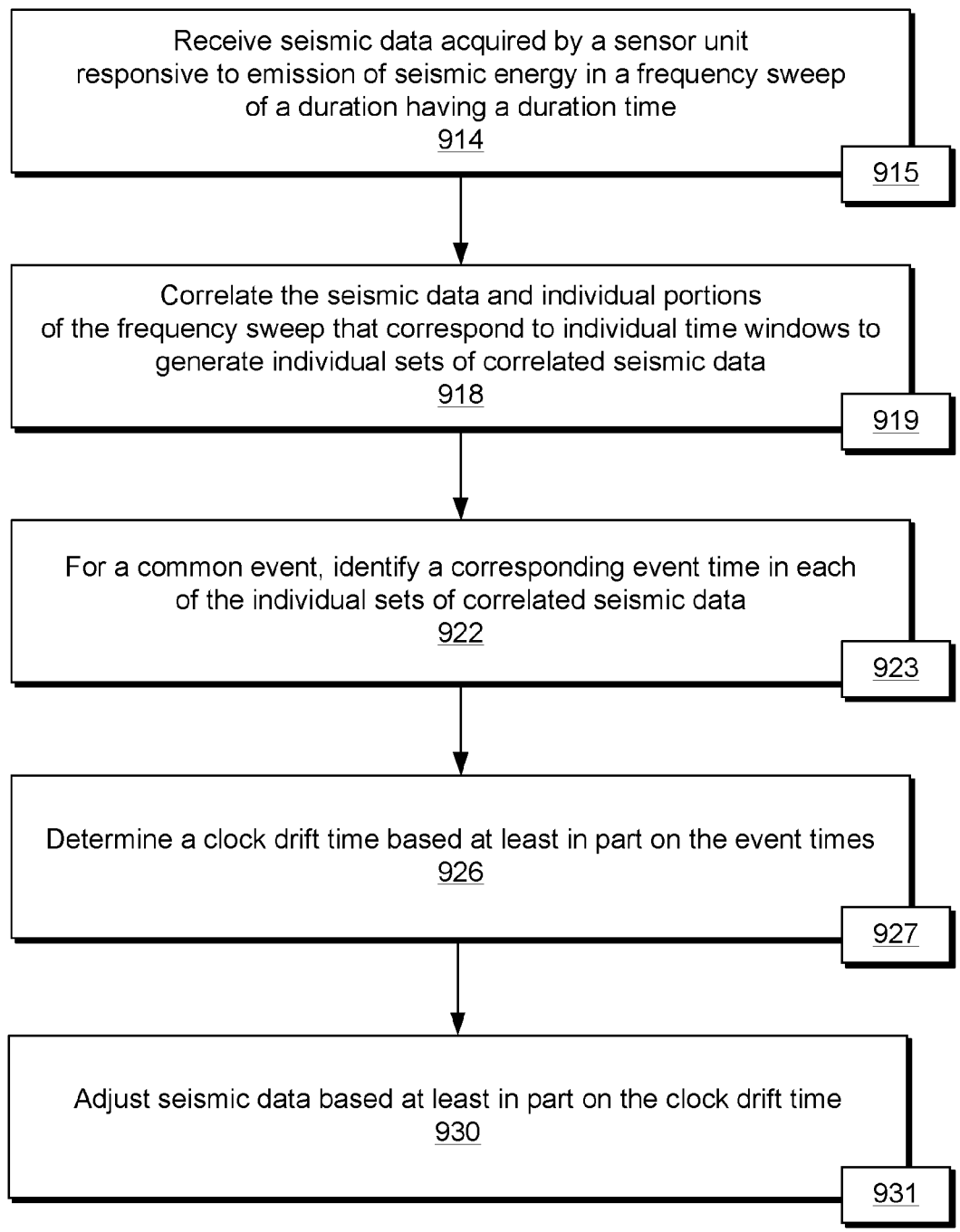
FIG. 9 illustrates a method.

FIG. 9 shows a method 910 that includes a reception block 914 for receiving seismic data acquired by a sensor unit responsive to emission of seismic energy in a frequency sweep of a duration having a duration time; a correlation block 918 for correlating the seismic data and individual portions of the frequency sweep that correspond to individual time windows to generate individual sets of correlated seismic data; an identification block 922 that, for a common event, includes identifying a corresponding event time in each of the individual sets of correlated seismic data; a determination block 926 for determining a clock drift time based at least in part on the event times; and an optional adjustment block 930 for adjusting seismic data based at least in part on the clock drift time. An analysis of seismic data may include adjusting the data (adjusting one or more traces, etc. with respect to time based at least in part on drift in a clock, etc.).

The method 910 is shown in FIG. 9 in association with various computer-readable media (CRM) blocks 915, 919, 923, 927 and 931. Such blocks generally include instructions suitable for execution by one or more processors (or cores) to instruct a computing device or system to perform one or more actions. While various blocks are shown, a single medium may be configured with instructions to allow for, at least in part, performance of various actions of the method 910. A computer-readable medium (CRM) may be a computer-readable storage medium that is not a carrier wave, that is not a signal and that is non-transitory. The blocks may be provided as instructions such as the instructions 270 of the system 250 of FIG. 2.

An event can be an appearance of seismic data as a diffraction, reflection, refraction or other similar feature produced by an arrival of seismic energy. An event can be a single wiggle within a trace, or a consistent lining up of several wiggles over several traces. An event in a seismic section can represent a geologic interface, such as a fault, unconformity or change in lithology. An event can represent a horizon in a geologic environment.

Seismic energy that interacts with a feature in a geologic environment can appear as an event in recorded seismic data (raw measurement data, RMD). Such an event may be recorded in seismic data for a range of frequencies (from about 1 Hz to about 100 Hz, etc.). A method can include selecting an event that is "visible" to seismic energy over a range of frequencies in a frequency sweep. For purposes of determining clock drift, events may be identified and a common event may be selected that is exhibited prominently in seismic data for various frequencies.

A clock drift time can correspond to a clock of a sensor unit. A clock drift time can correspond to drift of a clock of a sensor unit with reference to a different clock (a global clock, a master clock, etc.).

Individual time windows can include two individual time windows or more than two time windows of a frequency sweep (see the plot 815 of FIG. 8). For a two time window approach, a first of the time windows can span a first half of a duration and a second of the time windows can span a second half of the duration of a frequency sweep. A method can include determining a clock drift time by comparing the difference between event times for the same event when the record is correlated with the first and second halves of the frequency sweep.

A sensor unit can be a land-based sensor unit. A sensor unit can be a seafloor sensor unit.

A method can include generating emission of seismic energy in a frequency sweep of a duration, having a duration time, via a vibrator (emitting seismic energy).

A method can include generating emission of seismic energy in a frequency sweep of a duration having a duration time via one or more seismic energy sources.

A method can include adjusting seismic data based at least in part on the clock drift time; consider adjusting seismic data in a framework such as the PETREL® framework.

A method can include receiving seismic data acquired by a sensor unit responsive to emission of seismic energy in a frequency sweep of a duration having a duration time; correlating the seismic data and individual portions of the frequency sweep that correspond to individual time windows to generate individual sets of correlated seismic data; for a common event, identifying a corresponding event time in each of the individual sets of correlated seismic data; and determining a clock drift time based at least in part on the event times. In such a method, the sensor unit can be a node of a plurality of nodes of a land-based seismic survey and/or a marine-based seismic survey (using seabed or seafloor nodes).

A method can include determining a clock drift time that can correspond to a clock of a sensor unit. Such a clock drift time can correspond to drift of the clock of the sensor unit with reference to a different clock. Such a clock may be associated with one or more analog-to-digital converters (ADCs) that can convert analog signals of sensed seismic energy to digital signals, which may be stored in memory of a sensor unit. A method can include harvesting data from data storage devices of a plurality of sensor units. A seismic survey can include emitting seismic energy and receiving seismic energy via a plurality of seismic sensor unit arranged as nodes (land nodes and/or seabed nodes). Such sensor units may be interrogated (via short-range transmitters, via removal of memory cards, etc.) to acquire the data stored therein. Such data may then be processes to determine clock drift for one or more of the sensor units (as to corresponding ADC related clocks, etc.).

A method can be performed for a single sensor unit to determine whether a clock of the single sensor unit drifts and an extent of drift. Drift may be determined based at least in part on information as to emission of seismic energy and based at least in part on information stored in the single sensor unit as to sensing of at least a portion of that seismic energy in a geologic environment that includes at least one reflector that can give rise to an event identifiable in the information stored in the single sensor unit. For that event, multiple times may be identified for portions of a duration of a frequency sweep of the emission of seismic energy. In such an approach, the multiple times may be expected to have certain values and where such times do not have certain values, clock drift may be an underlying cause, which may be quantifiable to adjust the information, which may then be used in a seismic data processing and/or interpretation workflow. A method can allow for reduction of clock drift error in seismic data acquired by a seismic sensor unit that include a clock, which may be a clock associated with circuitry of the seismic sensor unit (an ADC clock, etc.).

A method can include using individual time windows where such time window can be two individual time windows or more than two individual time windows (three, four, etc.). Where two individual time windows are utilized, a first of the time windows can span a first half of the duration of the frequency sweep and a second of the time windows can span a second half of the duration of the frequency sweep. Where a duration time is T, the time windows can each be of a length (duration) T/2. In such an approach, a method can include determining a clock drift time by comparing event times of the same event correlated with each of the individual time windows of the frequency sweep.

A method can include generating emission of seismic energy in a frequency sweep of a duration via a vibrator and/or generating emission of seismic energy in a frequency sweep of a duration via one or more seismic energy sources.

A method can include adjusting seismic data based at least in part on the clock drift time. Where a clock of a sensor unit drifts, times associated with data stored in a storage device (memory card, drive, etc.) of the sensor unit can be adjusted according to one or more determined time drifts. A method can include determining two or more time drifts for a clock of a sensor unit and interpolating such time drifts to establish a relationship of time drift with respect to time for a clock of the sensor unit. In such an approach, the relationship may be utilized to adjust one or more times as associated with seismic data stored by the sensor unit as harvested and analyzed to determine the two or more time drifts of the clock of the sensor unit. Seismic data of a sensor unit can be harvested and analyzed to determine a clock drift time where the clock drift time may be used to adjust the seismic data. In such an approach, the adjusted seismic data may be utilized in combination with seismic data (adjusted, etc.) from one or more other sensor units. In such an approach, clock time drift errors may be reduced as to their impacts on seismic data from a plurality of sensor units (nodes).

A system can include a processor; memory operatively coupled to the processor; and instructions stored in the memory and executable by the processor to instruct the system to: receive seismic data acquired by a sensor unit responsive to emission of seismic energy in a frequency sweep of a duration having a duration time; correlate the seismic data and individual portions of the frequency sweep that correspond to individual time windows to generate individual sets of correlated seismic data; for a common event, identify a corresponding event time in each of the individual sets of correlated seismic data; and determine a clock drift time based at least in part on the event times. A duration time may be a programmed time for a frequency sweep as a seismic energy emission by a source such as a vibrator, etc. (a land-based source or a marine-based source).

A clock drift time can correspond to a clock of a sensor unit where the clock drift time corresponds to drift of the clock of the sensor unit with reference to a different clock (a clock of another sensor unit, a global clock, a master clock, etc.).

One or more computer-readable storage media can include computer-executable instructions to instruct a computing device to receive seismic data acquired by a sensor unit responsive to emission of seismic energy in a frequency sweep of a duration having a duration time; correlate the seismic data and individual portions of the frequency sweep that correspond to individual time windows to generate individual sets of correlated seismic data; for a common event, identify a corresponding event time in each of the individual sets of correlated seismic data; and determine a clock drift time based at least in part on the event times. In such an approach, the computer-readable storage media are non-transitory and not carrier waves and not signals. While a computing device is mentioned, a computing system may be utilized for execution of the instructions.

A method can include receiving a timing signal; adjusting time of a clock based at least in part on the timing signal; sensing seismic energy at a plurality of clock times; and recording the clock times and values associated with the sensed seismic energy. The timing signal can include or be a GPS timing signal and/or include or be an acoustic timing signal. Receiving a timing signal can occur via a pressure sensor, an accelerometer or a pressure sensor and an accelerometer.

Figure 10:
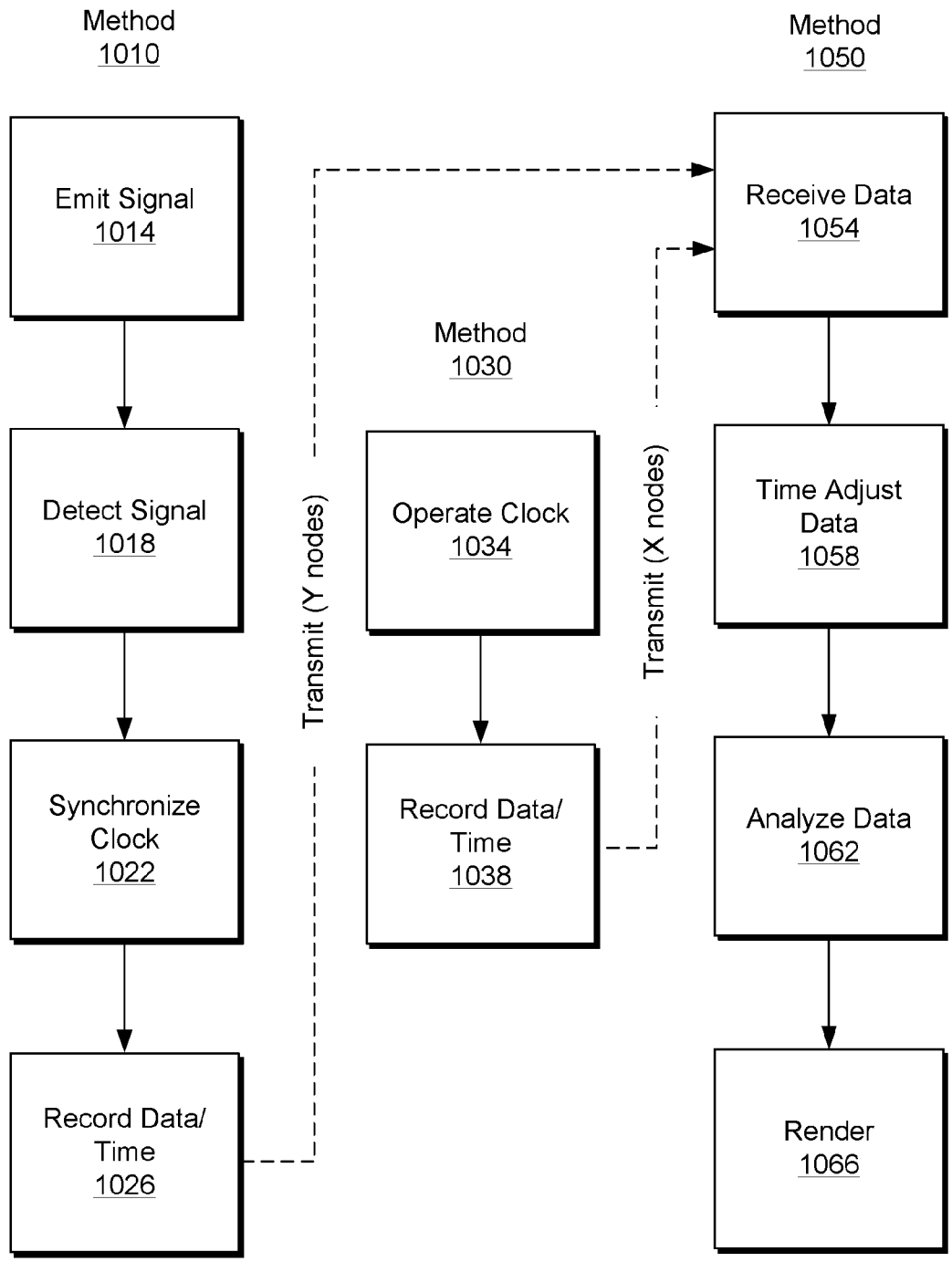
FIG. 10 illustrates methods.

FIG. 10 shows a method 1000 that can include a method 1010, a method 1030 and a method 1050. As shown, the method 1010 includes an emission block 1014 for emitting a signal, a detection block 1018 for detecting the signal, a synchronization block 1022 for synchronizing a local clock based at least in part on the detection of the signal and a record block 1026 for recording data and time where the time is recorded based on the local clock. In such an approach, the detection block 1018 may be associated with one of a plurality of specialized nodes (Y nodes). Where a survey includes about 100 nodes (X nodes plus Y nodes), about four of the nodes maybe specialized with circuitry (Y nodes) that allows sampling synchronized to a global clock (a global clock signal as may be detected by the about four nodes. In such an approach, the specialized nodes (Y nodes) may be positioned in an area of a survey, along with the other nodes (X nodes), which too can include local clocks. A local clock may be utilized for data sampling, which may include analog to digital conversion. A method can include providing about 10 percent or less of sensor units (nodes) as specialized nodes for detecting timing signals (see Y nodes). A method can include providing about 5 percent or less of sensor units as specialized nodes for detecting timing signals (see Y nodes).

As shown, the method 1030 includes an operation block 1034 for operating a local clock and a record block 1038 for recording data and time where the time is recorded based on the local clock. Such a method can proceed by providing nodes (X nodes and Y nodes) that include circuitry that detect the signal emitted by the emission clock where the specialized nodes sample the signal synchronized to the global clock. Specialized nodes can include circuitry that samples an emitted signal in a manner synchronized to a global clock (a master clock, etc.).

As shown in FIG. 10, the method 1050 includes a reception block 1054 for receiving data that includes data recorded by specialized nodes (Y nodes) and non-specialized nodes (X nodes) where such data includes time information (time stamps, etc.) that correspond to local clocks of the nodes (both the Y nodes and the X nodes). As shown, the method 1050 includes an adjustment block 1058 for adjusting data associated with non-specialized nodes (X nodes) based on time information from the specialized nodes (Y nodes), an analysis block 1062 for analyzing at least a portion of the adjusted data and a render block 1066 for rendering information to a display based at least in part on the analyzing.

As shown in FIG. 10, the method 1000 can include transmitting data (and associated information) of the Y nodes and X nodes to a centralized data processing hub (a computer, etc.). Thus, the method 1050 can be a post-transmission method (a post data harvesting method) where timing is addressed (adjusted) once data from different types of nodes has been received. Such an approach may alleviate, at least in part, field based synchronization as to sampling and transmission.

The method 1000 may include one or more additional post-transmission processing techniques that aim to adjust timings associated with data. Special signals may be emitted and recorded where such signals are then sought to be analyzed to synchronize timings. One or more other techniques may be implemented (as discussed above, etc.) in a post-transmission approach to harmonization (synchronization) of data (after data are harvested from sensor units after an emission/reception portion(s) of a seismic survey). Harvesting can include retrieving sensor units from a field (land or seabed) and interrogating the sensor units (wired, wirelessly and/or by removal of one or more removable storage media).

Figure 11:
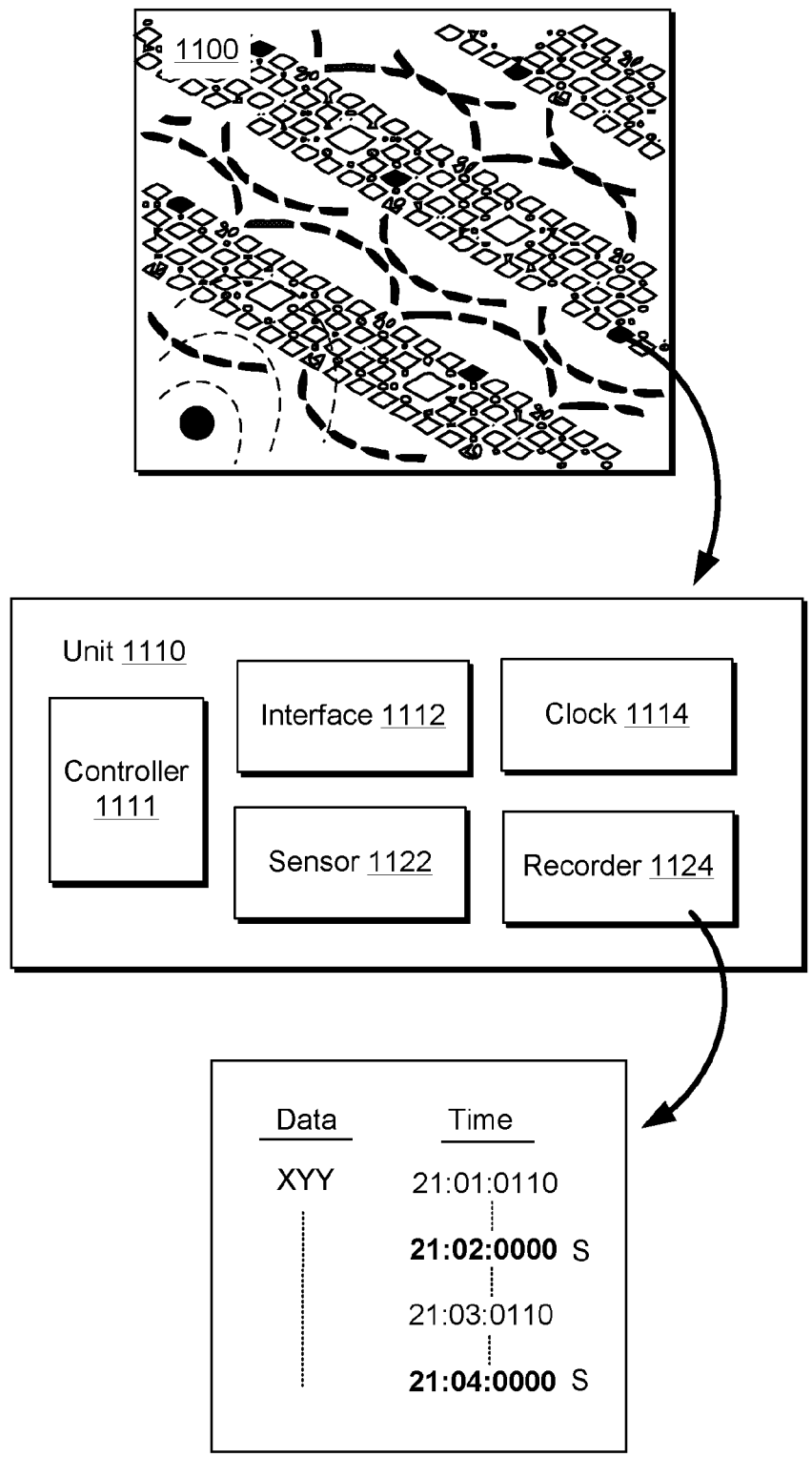
FIG. 11 illustrates a system.

FIG. 11 shows a portion of a survey 1100 that includes units where at least some of the units are specialized units. A specialized unit 1110 is shown in FIG. 11, which includes a controller 1111 (a processor, ARM, RISC, etc.), an interface 1112, a clock 1114, a sensor 1122 and a recorder 1124. In FIG. 11, the interface 1112 can receive an emitted signal where the unit 1110 can adjust the clock 1114 based at least in part on the signal. Sensed information of the sensor 1122 may be recorded by the recorder 1124 where such information may be time stamped. A time stamp may be an intermediate time stamp or a time stamp associated with a received signal. The bold times shown in FIG. 11 correspond to times associated with an emitted signal that can be associated with a time signal of a master clock (an atomic clock, a clock synchronized by an atomic clock, etc.). Drift may occur as to the clock 1114 for intermediate times. The data stamped with intermediate times may optionally be adjusted, by the unit or after transmission of the data to a remote unit. The "master" times may be utilized to synchronize data transmitted to the remote unit (a centralized data processing hub, etc.) by one or more other unit, which may include specialized and non-specialized units.

A method can include receiving a timing signal; adjusting time of a clock based at least in part on the timing signal; sensing seismic energy at a plurality of clock times; and recording the clock times and values associated with the sensed seismic energy. In such a method, the timing signal can be or include one or more of a GPS timing signal and an acoustic timing signal. A method can include receiving a timing signal that occurs repeatedly at predetermined intervals.

A method can include transmitting recorded clock times and values via a wireless network.

A method can include receiving timing information via a sensor, which may be a seismic sensor or another type of sensor. Timing information may be received via a pressure sensor. Timing information may be received via an accelerometer or accelerometers. Timing information may be received by a plurality of sensors, which may include different types of sensors.

A method can include receiving data from a plurality of sensor units of a seismic survey where the data include time stamps; analyzing at least a portion of the data for time information; and adjusting at least a portion of the time stamps based at least in part on the time information. The sensor units can include specialized sensor units and non-specialized sensor units where information received from the specialized sensor units can be utilized to adjust times (time stamps, etc.) of information received from the non-specialized sensor units. Such a method can be a post-transmission time adjustment method that aims to synchronize times for information received from a plurality of sensor units associated with a survey such as a seismic survey.

A method can include analyzing a pattern of shot gathers. A method can include analyzing a pattern for presence of a straight line where deviation from the straight line represents time information associated with clock drift of at least one of a plurality of sensor units. A method can include analyzing a pattern for presence of a parabola where deviation from the parabola represents time information associated with clock drift of at least one of a plurality of sensor units. A method can include determining a time difference estimate for common events correlated by parts of a sweep where a ratio of the time difference estimate to an expected time difference from the sweep represents time information that corresponds to clock drift (of at least one of a plurality of sensor units).

A system can include a processor; memory operatively coupled to the processor; instructions stored in the memory and executable by the processor to instruct the system to receive data from a plurality of sensor units of a seismic survey where the data include time stamps; analyze at least a portion of the data for time information; and adjust at least a portion of the time stamps based at least in part on the time information. Such instructions may be provided as stored in one or more computer-readable storage media.

A system may include one or more modules, which may be provided to analyze data, control a process, perform a task, perform a workstep, perform a workflow, etc.

Figure 12:
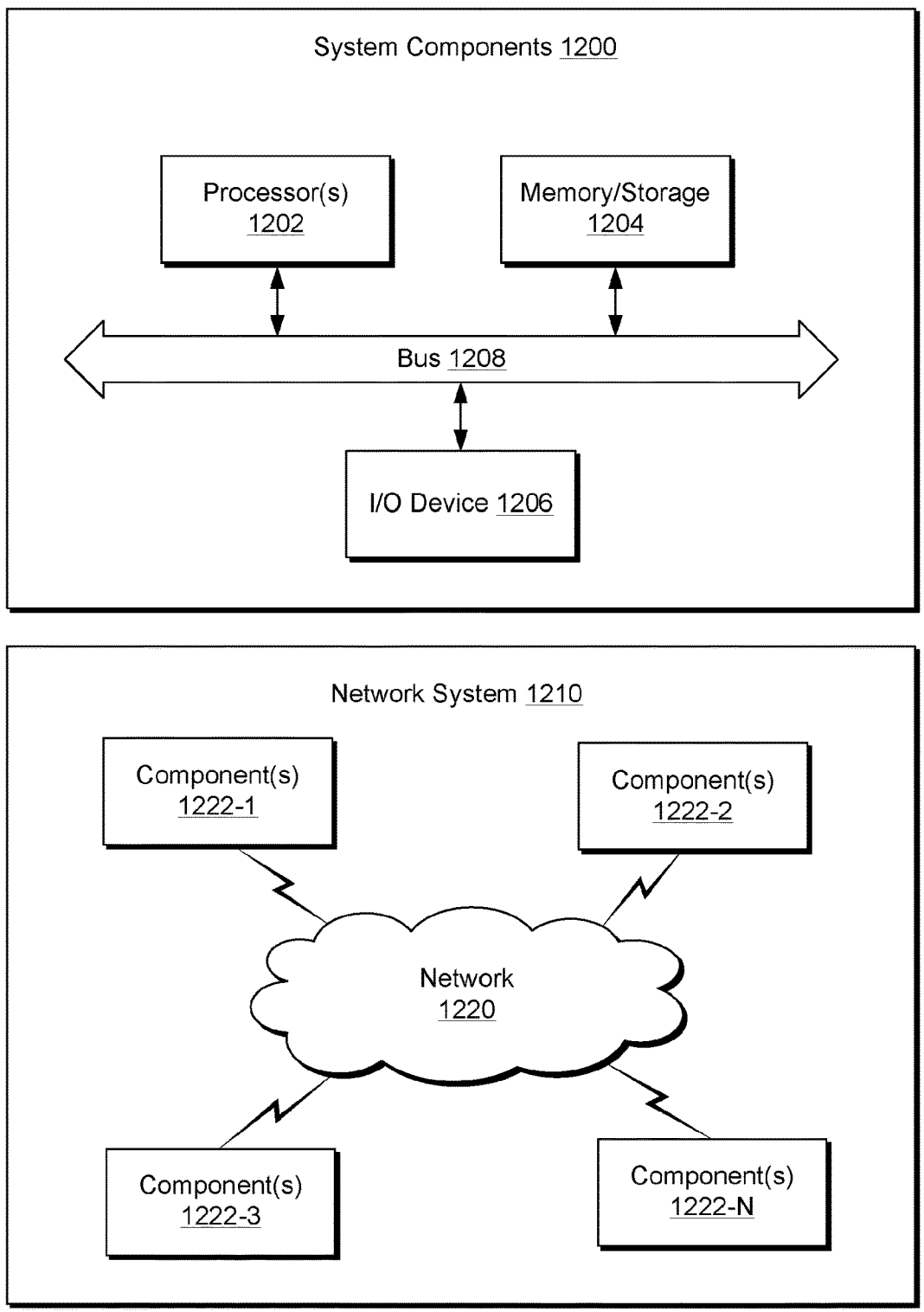
FIG. 12 illustrates components of a system and a networked system.

FIG. 12 shows components of a computing system 1200 and a networked system 1210. The system 1200 includes one or more processors 1202, memory and/or storage components 1204, one or more input and/or output devices 1206 and a bus 1208. Instructions may be stored in one or more computer-readable media (see memory/storage components 1204). Such instructions may be read by one or more processors (see the processor(s) 1202) via a communication bus (see the bus 1208), which may be wired or wireless. The one or more processors may execute such instructions to implement (wholly or in part) one or more attributes (as part of a method). A user may view output from and interact with a process via an I/O device (see the device 1206). A computer-readable medium may be a storage component such as a physical memory storage device such as a chip, a chip on a package, a memory card, etc. (a computer-readable storage medium).

Components may be distributed, such as in the network system 1210. The network system 1210 includes components 1222-1, 1222-2, 1222-3, ... 1222-N. The components 1222-1 may include the processor(s) 1202 while the component(s) 1222-3 may include memory accessible by the processor(s) 1202. Further, the component(s) 1222-2 may include an I/O device for display and optionally interaction with a method. The network may be or include the Internet, an intranet, a cellular network, a satellite network, etc.

A device may be a mobile device that includes one or more network interfaces for communication of information. A mobile device may include a wireless network interface (operable via IEEE 802.11, ETSI GSM, BLUETOOTH®, satellite, etc.). A mobile device may include components such as a main processor, memory, a display, display graphics circuitry (optionally including touch and gesture circuitry), a SIM slot, audio/video circuitry, motion processing circuitry (accelerometer, gyroscope), wireless LAN circuitry, smart card circuitry, transmitter circuitry, GPS circuitry, and a battery. A mobile device may be configured as a cell phone, a tablet, etc. A method may be implemented (wholly or in part) using a mobile device. A system may include one or more mobile devices.

A system may be a distributed environment, such as a so-called "cloud" environment where various devices, components, etc. interact for purposes of data storage, communications, computing, etc. A device or a system may include one or more components for communication of information via one or more of the Internet (where communication occurs via one or more Internet protocols), a cellular network, a satellite network, etc. A method may be implemented in a distributed environment (wholly or in part as a cloud-based service).

Information may be input from a display (consider a touchscreen), output to a display or both. Information may be output to a projector, a laser device, a printer, etc. such that the information may be viewed. Information may be output stereographically or holographically. As to a printer, consider a 2D or a 3D printer. A 3D printer may include one or more substances that can be output to construct a 3D object. Data may be provided to a 3D printer to construct a 3D representation of a subterranean formation.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
  receiving seismic data acquired by a sensor unit responsive to emission of seismic energy in a frequency sweep of a duration having a duration time;
  correlating the seismic data and a first individual portion of a plurality of individual portions of the frequency sweep that corresponds to a first individual time window of a plurality of individual time windows to generate a first correlated seismic dataset;
  correlating the seismic data and a second individual portion of the plurality of individual portions of the frequency sweep that corresponds to a second time window of the plurality of individual time windows to generate a second correlated seismic dataset;
  identifying a common event in the first correlated seismic dataset and the second correlated seismic dataset;
  identifying an event time corresponding to the common event in each of the first correlated seismic dataset and the second correlated seismic dataset; and
  determining a clock drift time based at least in part on the event time in each of the first correlated seismic dataset and the second correlated seismic dataset.

2. The method of claim 1 wherein the clock drift time corresponds to a clock of the sensor unit.

3. The method of claim 2 wherein the clock drift time corresponds to drift of the clock of the sensor unit with reference to a different clock.

4. The method of claim 1 wherein the plurality of individual time windows comprises the first individual time window spanning a first portion of the duration of the frequency sweep and the second individual time window spanning a second portion of the duration of the frequency sweep.

5. The method of claim 4 wherein the first individual time window spans a first half of the duration of the frequency sweep and wherein the second individual time window spans a second half of the duration of the frequency sweep.

6. The method of claim 5 wherein determining the clock drift time comprises comparing a plurality of event times of the same event correlated with the plurality of individual time windows of the frequency sweep.

7. The method of claim 1 wherein the plurality of individual time windows of the frequency sweep comprises more than two individual time windows.

8. The method of claim 1 wherein the sensor unit comprises a land-based sensor unit.

9. The method of claim 1 wherein the sensor unit comprises a seafloor sensor unit.

10. The method of claim 1 comprising generating the emission of seismic energy in the frequency sweep of the duration via a vibrator.

11. The method of claim 1 comprising generating the emission of seismic energy in the frequency sweep of the duration via one or more seismic energy sources.

12. The method of claim 1 comprising adjusting the seismic data based at least in part on the clock drift time.

13. A system comprising:
  a processor;
  memory operatively coupled to the processor, and
  instructions stored in the memory and executable by the processor to instruct the system to:
    receive seismic data acquired by a sensor unit responsive to emission of seismic energy in a frequency sweep of a duration having a duration time;
    correlate the seismic data and a first individual portion of a plurality of individual portions of the frequency sweep that corresponds to a first individual time window of a plurality of individual time windows to generate a first correlated seismic dataset;
    correlate the seismic data and a second individual portion of the plurality of individual portions of the frequency sweep that corresponds to a second time window of the plurality of individual time windows to generate a second correlated seismic dataset;
    identify a common event in the first correlated seismic dataset and the second correlated seismic dataset;
    identify an event time corresponding to the common event in each of the first correlated seismic dataset and the second correlated seismic dataset; and
    determine a clock drift time based at least in part on the event time in each of the first correlated seismic dataset and the second correlated seismic dataset.

14. The system of claim 13 wherein the clock drift time corresponds to a clock of the sensor unit.

15. The system of claim 14 wherein the clock drift time corresponds to drift of the clock of the sensor unit with reference to a different clock.

16. The system of claim 13 wherein the plurality of individual time windows comprise two or more individual time windows.

17. A non-transitory computer-readable medium, comprising, computer-executable instructions that, when executed by a processor, causes the processor to perform operations comprising:
  receiving seismic data acquired by a sensor unit responsive to emission of seismic energy in a frequency sweep of a duration having a duration time;
  correlating the seismic data and a first individual portion of a plurality of individual portions of the frequency sweep that corresponds to a first individual time window of a plurality of individual time windows to generate a first correlated seismic dataset;
  correlating the seismic data and a second individual portion of the plurality of individual portions of the frequency sweep that corresponds to a second time window of the plurality of individual time windows to generate a second correlated seismic dataset;

identifying a common event in the first correlated seismic dataset and the second correlated seismic dataset;

identifying an event time corresponding to the common event in each of the first correlated seismic dataset and the second correlated seismic dataset; and determining a clock drift time based at least in part on the event time in each of the first correlated seismic dataset and the second correlated seismic dataset.

18. The non-transitory computer-readable medium of claim 17 wherein the plurality of individual time windows comprises the first individual time window spanning a first portion of the duration of the frequency sweep and the second individual time window spanning a second portion of the duration of the frequency sweep.

19. The non-transitory computer-readable medium of claim 18 wherein the first individual time window spans a first half of the duration of the frequency sweep and wherein the second individual time window spans a second half of the duration of the frequency sweep.

20. The non-transitory computer-readable medium of claim 19 wherein determining the clock drift time comprises comparing a plurality of event times of the same event correlated with the plurality of individual time windows of the frequency sweep.

\* \* \* \* \*